(12) United States Patent
Guo et al.

(10) Patent No.: US 12,459,855 B2
(45) Date of Patent: Nov. 4, 2025

(54) FRACTURE RESISTANT GLASS-BASED ARTICLES

(71) Applicant: CORNING INCORPORATED, Corning, NY (US)

(72) Inventors: Xiaoju Guo, Pittsford, NY (US); Pascale Oram, Hammondsport, NY (US); Rostislav Vatchev Roussev, Painted Post, NY (US); Ljerka Ukrainczyk, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 820 days.

(21) Appl. No.: 17/642,273

(22) PCT Filed: Sep. 11, 2020

(86) PCT No.: PCT/US2020/050348
§ 371 (c)(1),
(2) Date: Mar. 11, 2022

(87) PCT Pub. No.: WO2021/050837
PCT Pub. Date: Mar. 18, 2021

(65) Prior Publication Data
US 2022/0324746 A1    Oct. 13, 2022

Related U.S. Application Data

(60) Provisional application No. 62/900,157, filed on Sep. 13, 2019.

(51) Int. Cl.
B32B 15/04    (2006.01)
B32B 17/06    (2006.01)
C03C 3/091    (2006.01)
C03C 3/095    (2006.01)

(52) U.S. Cl.
CPC ............. *C03C 3/091* (2013.01); *C03C 3/095* (2013.01)

(58) Field of Classification Search
CPC .................................................. C03C 21/002
USPC ........................................................ 428/410
See application file for complete search history.

(56) References Cited

U.S. PATENT DOCUMENTS

| 8,312,739 | B2 | 11/2012 | Lee et al. | |
| 8,561,429 | B2 | 10/2013 | Allan et al. | |
| 2017/0158556 | A1* | 6/2017 | Dejneka | C03C 3/097 |
| 2017/0166478 | A1* | 6/2017 | Gross | C03C 23/007 |

(Continued)

FOREIGN PATENT DOCUMENTS

| CN | 106866000 A | 6/2017 |
| CN | 107265884 A | 10/2017 |

(Continued)

OTHER PUBLICATIONS

International Search Report and Written Opinion of the International Searching Authority; PCT/US2020/050348; mailed on Jan. 13, 2021; 11 pages; European Patent Office.

(Continued)

*Primary Examiner* — Lauren R Colgan

(57) ABSTRACT

Glass-based articles comprise stress profiles providing improved fracture resistance. The stress profiles contain a (Continued)

high peak tension and a region with a high degree of negative curvature. The glass-based articles herein provide high fracture resistance after multiple drops.

20 Claims, 20 Drawing Sheets

(56) References Cited

U.S. PATENT DOCUMENTS

| | | | |
|---|---|---|---|
| 2017/0197869 A1* | 7/2017 | Beall | C03C 21/002 |
| 2017/0295657 A1 | 10/2017 | Gross et al. | |
| 2017/0305786 A1* | 10/2017 | Roussev | H05K 5/0217 |
| 2018/0105461 A1* | 4/2018 | Schneider | C03C 17/30 |
| 2019/0030861 A1 | 1/2019 | Bellman et al. | |
| 2019/0300422 A1* | 10/2019 | Guo | G02F 1/133308 |
| 2019/0389764 A1* | 12/2019 | Andrews | C03C 3/097 |
| 2021/0323863 A1 | 10/2021 | Oram et al. | |

FOREIGN PATENT DOCUMENTS

| | | |
|---|---|---|
| CN | 108367964 A | 8/2018 |
| CN | 108383398 A | 8/2018 |
| CN | 109305748 A | 2/2019 |
| CN | 109415250 A | 3/2019 |
| CN | 109952278 A | 6/2019 |
| KR | 10-2803906 B1 | 5/2025 |
| WO | 2018/071735 A1 | 4/2018 |
| WO | 2019/191480 A1 | 10/2019 |
| WO | 2020/102015 A1 | 5/2020 |
| WO | 2020/205304 A1 | 10/2020 |

OTHER PUBLICATIONS

Chinese Patent Application No. 202080064425.2, Office Action dated Jul. 13, 2023, 5 pages (English translation only), Chinese Patent Office.
Gehrke et al; "Effect of Corrosive Media on Crack Growth of Model Glasses and Commercial Silicate Glasses," Glastech. Ber., 63 255-265 (1990).
Gehrke et al; "Fatigue Limit and Crack Arrest in Alkali-Containing Silicate Glasses"; Journal of Materials Science; 26 (1991) pp. 5445-5455.
Guin et al; "Crack Growth Threshold in Soda Lime Silicate Glass: Role of Hold-Time," J. Non-Cryst Solids, 316 12-20 (2003).
Hirao et al., "Microhardness of SiO2 Glass in Various Environments", J. Am. Ceram. Soc., vol. 70, No. 7, 1987, pp. 497-502.
U.S. Appl. No. 61/079,995, "Glass with Compressive Surface for Consumer Applications", filed Jul. 11, 2008.
U.S. Appl. No. 61/084,398, "Dual Stage Ion Exchange for Chemical Strengthening of Glass", filed Jul. 29, 2008.
Wiederhorn et al; "Crack Growth in Soda-Lime-Silicate Glass Near the Static Fatigue Limit"; J. Am. Ceram. Soc., 85 [9] 2287-2292 (2011).
Wiederhorn et al; "Stress Corrosion and Static Fatigue of Glass"; J. Am. Ceram. Soc., 53 [10] 5438 (1970).
Wiederhorn, "Influence of Water Vapor on Crack Propagation in Soda-Lime Glass," J. Am. Ceram. Soc., 50 [8] 407-414 (1967).
Vietnamese Patent Application No. 1-2022-02120, Office Action dated Jul. 25, 2025, 1 page, Vietnamese Patent Office.

* cited by examiner

FRACTURE RESISTANT GLASS-BASED ARTICLES

CROSS-REFERENCE TO RELATED APPLICATIONS

This application is a national stage application of PCT/US2020/050348 filed Sep. 11, 2020, which claims the benefit of priority of U.S. Provisional Application Ser. No. 62/900,157 filed on Sep. 13, 2019 the content of which is relied upon and incorporated herein by reference in its entirety.

BACKGROUND

Field

The present specification generally relates to stress profiles for fracture resistant stress profiles in glass-based articles. More specifically, the present specification is directed to stress profiles for glass-based articles, which may be lithium-containing, that may be utilized in electronic devices.

Technical Background

The mobile nature of portable devices, such as smart phones, tablets, portable media players, personal computers, and cameras, makes these devices particularly vulnerable to accidental dropping on hard surfaces, such as the ground. These devices typically incorporate cover glasses, which may become damaged upon impact with hard surfaces. In many of these devices, the cover glasses function as display covers, and may incorporate touch functionality, such that use of the devices is negatively impacted when the cover glasses are damaged.

There are two major failure modes of cover glass when the associated portable device is dropped on a hard surface. One of the modes is flexure failure, which is caused by bending of the glass when the device is subjected to dynamic load from impact with the hard surface. The other mode is sharp contact failure, which is caused by introduction of damage to the glass surface. Impact of the glass with rough hard surfaces, such as asphalt, granite, etc., can result in sharp indentations in the glass surface. These indentations become failure sites in the glass surface from which cracks may develop and propagate.

It has been a continuous effort for glass makers and handheld device manufacturers to improve the resistance of handheld devices to failure. It is also desirable that portable devices be as thin as possible. Accordingly, in addition to strength, it is also desired that glasses to be used as cover glass in portable devices be made as thin as possible. Thus, in addition to increasing the strength of the cover glass, it is also desirable for the glass to have mechanical characteristics that allow it to be formed by processes that are capable of making thin glass articles, such as thin glass sheets.

Accordingly, a need exists for glass-based articles that can be strengthened, such as by ion exchange, and that have the mechanical properties that allow them to be formed as thin articles.

SUMMARY

Aspects of the disclosure pertain to glass-based articles and methods for their manufacture and use. Glass-based articles herein exhibit high fracture resistance. In particular, the glass-based articles herein provide high fracture resistance after multiple drops.

According to aspect (1), a glass-based article is provided. The glass-based article comprises: a glass-based substrate comprising opposing first and second surfaces defining a substrate thickness (t); and a stress profile. The stress profile comprises: a peak tension (PT) of greater than or equal to 70 MPa; and a point with a second derivative value of less than or equal to −4000 MPa/mm$^2$ where the point is located within the region of greater than or equal to 0.025t to less than or equal to 0.25t.

According to aspect (2), the glass-based article of the preceding aspect is provided, wherein the stress profile comprises a curvature transition point with a second derivative value of 0 MPa/mm$^2$, where the curvature transition point is located within the region of greater than or equal to 0.025t to less than or equal to 0.25t.

According to aspect (3), the glass-based article of any of the preceding aspects is provided, wherein the stress profile comprises a curvature transition point with a second derivative value of 0 MPa/mm$^2$, where the curvature transition point is located within the region of greater than or equal to 0.7·DOC to less than or equal to 0.25t.

According to aspect (4), the glass-based article of any of the preceding aspects is provided, wherein the stress profile comprises a point with a second derivative value of less than or equal to −5000 MPa/mm$^2$ where the point is located within the region of greater than or equal to 0.025t to less than or equal to 0.25t.

According to aspect (5), the glass-based article of any of the preceding aspects is provided, wherein the stress profile comprises a point with a second derivative value of less than or equal to −2550/t$^2$ MPa/mm$^2$ where t is in mm, and where the point is located within the region of greater than or equal to 0.025t to less than or equal to 0.25t.

According to aspect (6), the glass-based article of any of the preceding aspects is provided, comprising a compressive region extending from the first surface to a depth of compression (DOC), wherein the stress profile comprises a local maximum of an absolute value of the slope located within 0.1·DOC of the DOC.

According to aspect (7), the glass-based article of aspect (6) is provided, wherein the local maximum of the absolute value of the slope is greater than or equal to 0.5 MPa/µm.

According to aspect (8), the glass-based article of any of the preceding aspects is provided, wherein the PT is greater than or equal to 80 MPa.

According to aspect (9), the glass-based article of any of the preceding aspects is provided, wherein the PT is less than or equal to 200 MPa.

According to aspect (10), the glass-based article of any of the preceding aspects is provided, wherein the PT is greater than or equal to $$\frac{62.6}{\sqrt{t}} MPa$$

where t is in mm.

According to aspect (11), the glass-based article of any of the preceding aspects is provided, wherein the PT is less than or equal to $$\frac{170}{\sqrt{t}} MPa$$

where t is in mm.

According to aspect (12), the glass-based article of any of the preceding aspects is provided, wherein a glass-based substrate having the same composition and structure as the center of the glass-based article has a $K_{IC}$ of greater than or equal to 0.85 MPa$\sqrt{m}$.

According to aspect (13), the glass-based article of any of the preceding aspects is provided, wherein a glass-based substrate having the same composition and structure as the center of the glass-based article has a $K_{IC}$ of less than or equal to 2 MPa$\sqrt{m}$.

According to aspect (14), the glass-based article of any of the preceding aspects is provided, comprising a compressive stress at a knee ($CS_k$) greater than or equal to 80 MPa.

According to aspect (15), the glass-based article of any of the preceding aspects is provided, comprising a compressive stress at a knee ($CS_k$) greater than or equal to $$\frac{71.5}{\sqrt{t}} MPa$$

where t is in mm.

According to aspect (16), the glass-based article of any of the preceding aspects is provided, comprising a compressive region extending from the first surface to a depth of compression (DOC), and the DOC is greater than or equal to 0.15t.

According to aspect (17), the glass-based article of any of the preceding aspects is provided, comprising a compressive region extending from the first surface to a depth of compression (DOC), and the DOC is greater than or equal to 130 µm.

According to aspect (18), the glass-based article of any of the preceding aspects is provided, comprising a compressive stress greater than or equal to 330 MPa.

According to aspect (19), the glass-based article of any of the preceding aspects is provided, comprising a spike region extending from the first surface to a depth of layer of a spike ($DOL_{sp}$), and the $DOL_{sp}$ is greater than or equal to 3 µm.

According to aspect (20), the glass-based article of any of the preceding aspects is provided, comprising a spike region extending from the first surface to a depth of layer of a spike ($DOL_{sp}$), and the $DOL_{sp}$ is less than or equal to 15 µm.

According to aspect (21), the glass-based article of any of the preceding aspects is provided, wherein the stress profile comprises a first compressive region extending from the first surface to a first depth of compression $DOC_1$, a second compressive region extending from the second surface to a second depth of compression $DOC_2$, and a tensile region extending from $DOC_1$ to $DOC_2$, wherein the tensile region has a tensile stress factor $K_T$ greater than or equal to 1.41 MPa·$\sqrt{m}$.

According to aspect (22), the glass-based article of any of the preceding aspects is provided, wherein the glass-based article is non-frangible.

According to aspect (23), the glass-based article of any of the preceding aspects is provided, comprising $Li_2O$.

According to aspect (24), the glass-based article of any of the preceding aspects is provided, wherein the $Li_2O$ concentration at the center of the glass-based article is greater than or equal to 8 mol %.

According to aspect (25), the glass-based article of any of the preceding aspects is provided, wherein a maximum $K_2O$ concentration in the glass-based article is less than or equal to 7.5 mol % greater than the $K_2O$ concentration at the center of the glass-based article.

According to aspect (26), the glass-based article of any of the preceding aspects is provided, comprising a spike region extending from the first surface to a depth of layer of a spike ($DOL_{sp}$), wherein an integral of a $K_2O$ concentration increase over a $K_2O$ concentration at the center of the glass-based article in the spike region is less than or equal to 29 mol %·µm.

According to aspect (27), the glass-based article of any of the preceding aspects is provided, comprising a spike region extending from the first surface to a depth of layer of a spike ($DOL_{sp}$), wherein an integral of a $K_2O$ concentration increase over a $K_2O$ concentration at the center of the glass-based article in the spike region is greater than or equal to 4 mol %·µm.

According to aspect (28), the glass-based article of any of the preceding aspects is provided, wherein the center of the glass-based article has a $Li_2O/Na_2O$ molar ratio that is greater than or equal to 3.3.

According to aspect (29), the glass-based article of any of the preceding aspects is provided, wherein the center of the glass-based article has a $Li_2O/Na_2O$ molar ratio that is less than or equal to 100.

According to aspect (30), the glass-based article of any of the preceding aspects is provided, wherein t is greater than or equal to 0.2 mm to less than or equal to 2.0 mm.

According to aspect (31), the glass-based article of any of the preceding aspects is provided, wherein t is greater than or equal to 0.3 mm to less than or equal to 1.0 mm.

According to aspect (32), the glass-based article of any of the preceding aspects is provided, comprising a compressive region extending from the first surface to a depth of compression (DOC), and a compressive stress at a depth of 0.6·DOC from the first surface is greater than or equal to 45 MPa.

According to aspect (33), the glass-based article of any of the preceding aspects is provided, comprising a compressive region extending from the first surface to a depth of compression (DOC), and a compressive stress at a depth of 0.65·DOC from the first surface is greater than or equal to 40 MPa.

According to aspect (34), the glass-based article of any of the preceding aspects is provided, comprising a compressive region extending from the first surface to a depth of compression (DOC), and a compressive stress at a depth of 0.7·DOC from the first surface is greater than or equal to 37 MPa.

According to aspect (35), the glass-based article of any of the preceding aspects is provided, comprising a compressive region extending from the first surface to a depth of compression (DOC), and a compressive stress at a depth of 0.75·DOC from the first surface is greater than or equal to 32 MPa.

According to aspect (36), the glass-based article of any of the preceding aspects is provided, comprising a compressive region extending from the first surface to a depth of compression (DOC), and a compressive stress at a depth of 0.8·DOC from the first surface is greater than or equal to 26 MPa.

According to aspect (37), the glass-based article of any of the preceding aspects is provided, comprising a compressive region extending from the first surface to a depth of compression (DOC), and a compressive stress at a depth of 0.85·DOC from the first surface is greater than or equal to 18 MPa.

According to aspect (38), the glass-based article of any of the preceding aspects is provided, comprising a compressive region extending from the first surface to a depth of compression (DOC), and a compressive stress at a depth of 0.9·DOC from the first surface is greater than or equal to 11 MPa.

According to aspect (39), the glass-based article of any of the preceding aspects is provided, comprising a $Na_2O$ concentration profile in the region of greater than or equal to 0.025t to less than or equal to 0.25t, and wherein the $Na_2O$ concentration profile exhibits a positive curvature or no curvature in the region of greater than or equal to 0.025t to less than or equal to 0.25t.

According to aspect (40), the glass-based article of any of the preceding aspects is provided, wherein the center of the glass-based article comprises: 50 mol % to 69 mol % $SiO_2$; 12.5 mol % to 25 mol % $Al_2O_3$; 0 mol % to 8 mol % $B_2O_3$; greater than 0 mol % to 4 mol % CaO; greater than 0 mol % to 17.5 mol % MgO; 0.5 mol % to 8 mol % $Na_2O$; 0 mol % to 2.5 mol % $La_2O_3$; and greater than 8 mol % to 18 mol % $Li_2O$; wherein: $(Li_2O+Na_2O+MgO)/Al_2O_3$ is from 0.9 to less than 1.3; and
$Al_2O_3+MgO+Li_2O+ZrO_2+La_2O_3+Y_2O_3$ is from greater than 23 mol % to less than 50 mol %.

According to aspect (41), a consumer electronic product is provided. The consumer electronic product comprises: a housing comprising a front surface, a back surface, and side surfaces; electrical components provided at least partially within the housing, the electrical components comprising at least a controller, a memory, and a display, the display being provided at or adjacent the front surface of the housing; and a cover disposed over the display; wherein at least a portion of at least one of the housing and the cover comprises the glass-based article of one of the preceding aspects.

According to aspect (42), a method is provided. The method comprises: exposing to an ion exchange treatment a glass-based substrate comprising opposing first and second surfaces defining a substrate thickness (t) to form a glass-based article with a stress profile comprising, the stress profile comprising: a peak tension (PT) of greater than or equal to 70 MPa; and a point with a second derivative value of less than or equal to −4000 MPa/mm$^2$ where the point is located within the region of greater than or equal to 0.025t to less than or equal to 0.25t.

According to aspect (43), the method of aspect (42) is provided, wherein the ion exchange treatment is a single ion exchange treatment.

According to aspect (44), the method of any of aspects (42) to the preceding aspect is provided, wherein the glass-based substrate comprises: 50 mol % to 69 mol % $SiO_2$; 12.5 mol % to 25 mol % $Al_2O_3$; 0 mol % to 8 mol % $B_2O_3$; greater than 0 mol % to 4 mol % CaO; greater than 0 mol % to 17.5 mol % MgO; 0.5 mol % to 8 mol % $Na_2O$; 0 mol % to 2.5 mol % $La_2O_3$; and greater than 8 mol % to 18 mol % $Li_2O$; wherein: $(Li_2O+Na_2O+MgO)/Al_2O_3$ is from 0.9 to less than 1.3; and
$Al_2O_3+MgO+Li_2O+ZrO_2+La_2O_3+Y_2O_3$ is from greater than 23 mol % to less than 50 mol %.

According to aspect (45), the method of any of aspects (42) to the preceding aspect is provided, wherein the glass-based substrate comprises: $SiO_2$; $Al_2O_3$; and $Li_2O$, wherein the glass is characterized by a $K_{IC}$ value of at greater than or equal to 0.85 MPa√m.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
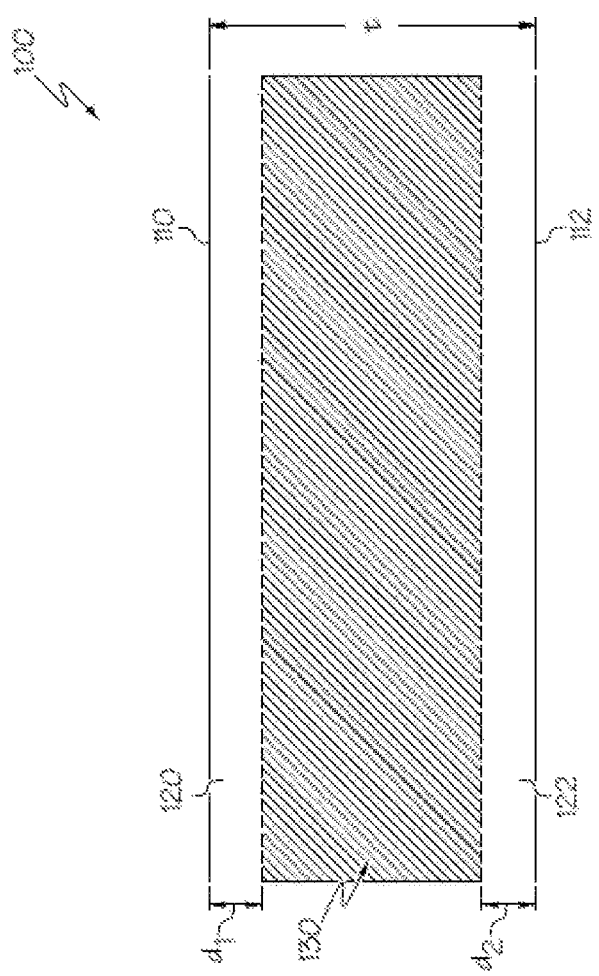
FIG. 1 schematically depicts a cross section of a glass having compressive stress layers on surfaces thereof according to embodiments disclosed and described herein.

Before describing several exemplary embodiments, it is to be understood that the disclosure is not limited to the details of construction or process steps set forth in the following disclosure. The disclosure provided herein is capable of other embodiments and of being practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment, or to only one embodiment. Furthermore, the particular features, structures, materials, or characteristics may be combined in any suitable manner in one or more embodiments.

Definitions and Measurement Techniques

The terms "glass-based article" and "glass-based substrates" are used to include any object made wholly or partly of glass, including glass-ceramics (including an amorphous phase and a crystalline phase). Generally, a glass-based substrate is subjected to an ion exchange treatment to form a glass-based article. Laminated glass-based articles include laminates of glass and non-glass materials, laminates of glass and crystalline materials. Glass-based substrates according to one or more embodiments can be selected from soda-lime silicate glass, alkali-alumino silicate glass, alkali-containing borosilicate glass, alkali-containing aluminoborosilicate glass, and alkali-containing glass-ceramics.

A "base composition" is a chemical make-up of a substrate prior to any ion exchange (IOX) treatment. That is, the base composition is undoped by any ions from IOX. Stated differently a glass-based substrate has the base composition prior to being subjected to ion exchange treatment. The center of a glass-based article that has been IOX treated is the least impacted by the IOX treatment and may not be affected by the IOX treatment. For this reason, the composition at the center of the glass-based article may be the same as the base composition when IOX treatment conditions are such that ions supplied for IOX do not diffuse into the center of the substrate. In one or more embodiments, a central composition at the center of the glass article comprises the base composition. Additionally, a glass-based substrate having the same composition and structure as the center of the glass-based article may have equivalent properties to the substrate utilized to form the glass-based article.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass-based article that is "substantially free of MgO" is one in which MgO is not actively added or batched into the glass-based article, but may be present in very small amounts as a contaminant. As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

Unless otherwise specified, all compositions described herein are expressed in terms of mole percent (mol %) on an oxide basis.

A "stress profile" is stress as a function of depth across the thickness of a glass-based article. A compressive stress region extends from a first surface to a depth of compression (DOC) of the article, where the article is under compressive stress. A central tension region extends from the DOC to include the region where the article is under tensile stress. Stated differently, a first compressive stress region may extend from a first surface to a first depth of compression ($DOC_1$), a tension region extending from $DOC_1$ to a second depth of compression ($DOC_2$), and a second compression region extending from $DOC_2$ to the second surface. In embodiments where the stress profile is symmetric, the distance from each surface to the respective DOC is equal.

As used herein, depth of compression (DOC) refers to the depth at which the stress within the glass-based article changes from compressive to tensile stress. At the DOC, the stress crosses from a positive (compressive) stress to a negative (tensile) stress and thus exhibits a stress value of zero. According to the convention normally used in mechanical arts, compression is expressed as a negative (<0) stress and tension is expressed as a positive (>0) stress. Throughout this description, however, positive values of stress are compressive stress (CS), which are expressed as a positive or absolute value—i.e., as recited herein, CS=|CS|. Additionally, negative values of stress are tensile stress. But when used with the term "tensile", stress or central tension (CT) may be expressed as a positive value, i.e., CT=|CT|. Central tension (CT) refers to tensile stress in a central region or a central tension region of the glass-based article. Maximum central tension (maximum CT or $CT_{max}$) occurs in the central tension region nominally at 0.5·t, where t is the article thickness, which allows for variation from exact center of the location of the maximum tensile stress. Peak tension (PT) refers to maximum tension measured, which may or may not be at the center of the article.

Figure 2:
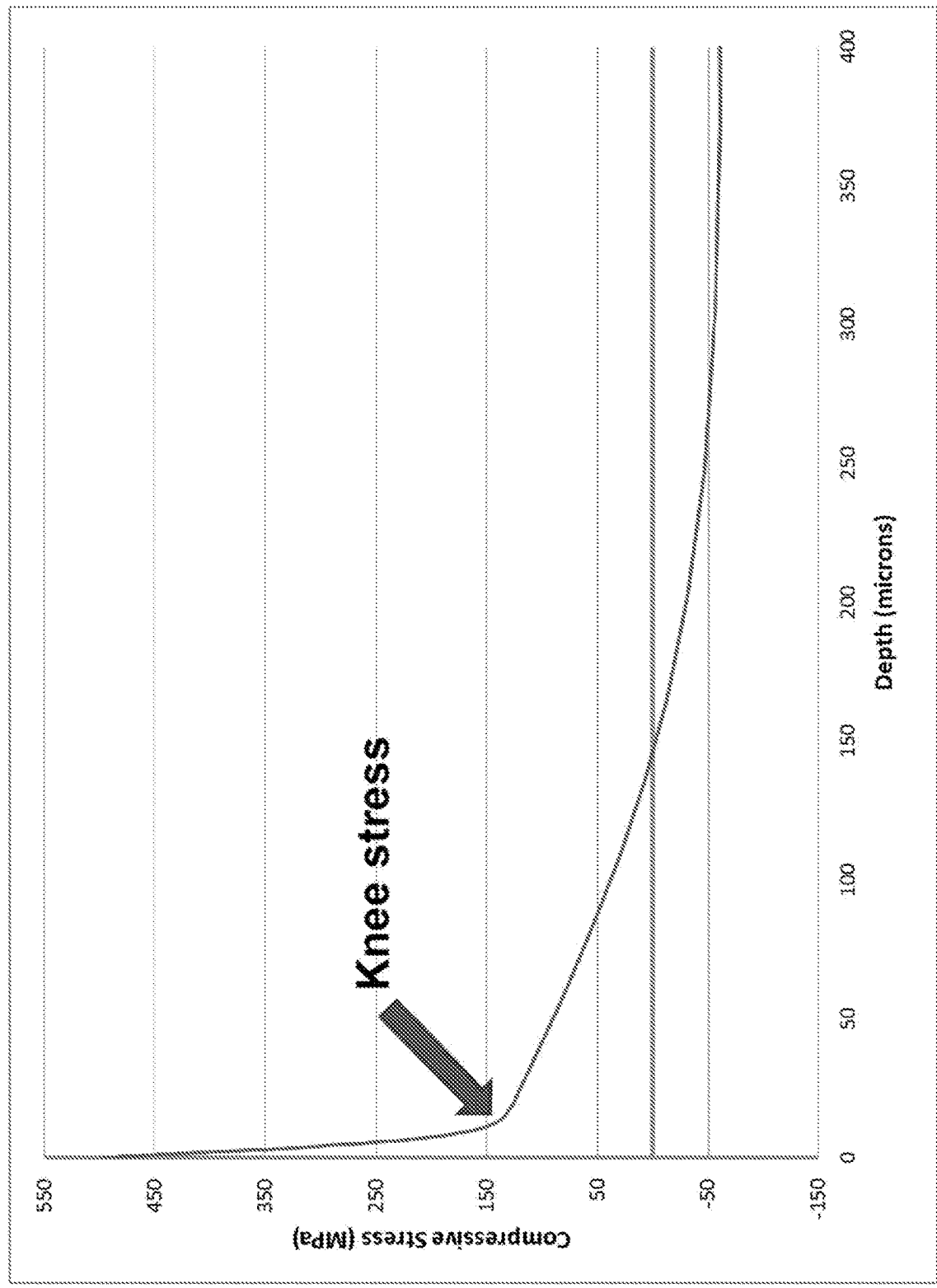
FIG. 2 is a schematic representation of a stress profile including a knee stress.

A "knee" of a stress profile is a depth of an article where the slope of the stress profile transitions from steep to gradual. The steep portion of the stress profile extending from the surface into the glass-based article is referred to as the "spike." The knee may refer to a transition area over a span of depths where the slope is changing. The knee compressive stress ($CS_k$) is defined as the value of compressive stress that the deeper portion of the CS profile extrapolates to at the depth of spike ($DOL_{sp}$). The $DOL_{sp}$ is reported as measured by a surface-stress meter by known methods. A schematic representation of a stress profile including a knee stress is provided in FIG. 2.

A non-zero metal oxide concentration that varies from the first surface to a depth of layer with respect to the metal oxide or that varies along at least a substantial portion of the article thickness (t) indicates that a stress has been generated in the article as a result of ion exchange. The variation in metal oxide concentration may be referred to herein as a metal oxide concentration gradient. The metal oxide that is non-zero in concentration and varies from the first surface to a depth of layer or along a portion of the thickness may be described as generating a stress in the glass-based article. The concentration gradient or variation of metal oxides is created by chemically strengthening a glass-based substrate in which a plurality of first metal ions in the glass-based substrate is exchanged with a plurality of second metal ions.

Unless otherwise specified, CT and CS are expressed herein in MegaPascals (MPa), thickness is express in millimeters and DOC and DOL are expressed in microns (micrometers, or µm).

Compressive stress (including peak CS, $CS_{max}$) and $DOL_{sp}$ are measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

The central tension (CT) and peak tension (PT) and stress retention values are measured using a scattered light polariscope (SCALP) technique known in the art. The Refracted near-field (RNF) method or SCALP may be used to measure the stress profile and the depth of compression (DOC). When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of from 1 Hz to 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

Figure 3:
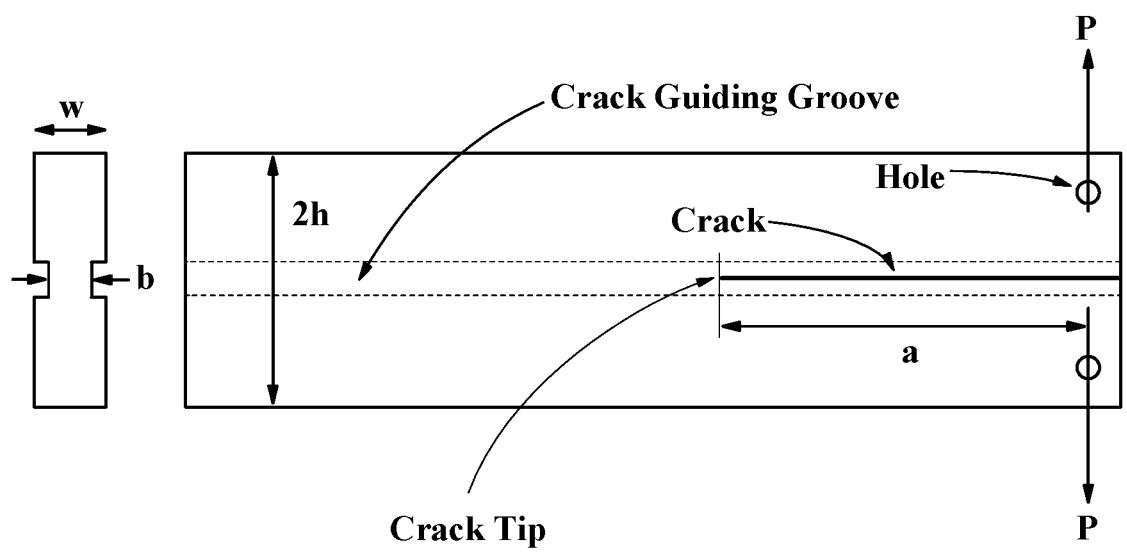
FIG. 3 is a schematic representation of a sample utilized to determine the fracture toughness $K_{IC}$ and a cross-section thereof.

As utilized herein, the fracture toughness ($K_{IC}$) is measured by the double cantilever beam (DCB) method. The $K_{IC}$ values were measured on glass-based substrates before being ion exchanged to form the glass-based articles. The DCB specimen geometry is shown in FIG. 3 with parameters being the crack length a, applied load P, cross-sectional dimensions w and 2h, and the thickness of the crack-guiding groove b. The samples were cut into rectangles of width 2h=1.25 cm and a thickness ranging from, w=0.3 mm to 1 mm, with the overall length of the sample, which is not a critical dimension, varying from 5 cm to 10 cm. A hole was drilled on both ends with a diamond drill to provide a means of attaching the sample to a sample holder and to the load. A crack "guiding groove" was cut down the length of the sample on both flat faces using a wafer dicing saw with a diamond blade, leaving a "web" of material, approximately half the total plate thickness (dimension b in FIG. 1), with a height of 180 µm corresponding to the blade thickness. The high precision dimensional tolerances of the dicing saw allow for minimal sample-to-sample variation. The dicing saw was also used to cut an initial crack where a=15 mm. As a consequence of this final operation a very thin wedge of material was created near the crack tip (due to the blade curvature) allowing for easier crack initiation in the sample. The samples were mounted in a metal sample holder with a steel wire in the bottom hole of the sample. The samples were also supported on the opposite end to keep the samples level under low loading conditions. A spring in series with a load cell (FUTEK, LSB200) was hooked to the upper hole which was then extended, to gradually apply load, using rope and a high precision slide. The crack was monitored using a microscope having a 5 µm resolution attached to a digital camera and a computer. The applied stress intensity, $K_P$, was calculated using the following equation (III):

$$K_P = \left[\frac{P \cdot a}{(w \cdot b)^{0.5} h^{1.5}}\right]\left[3.47 + 2.32\frac{h}{a}\right]$$

For each sample, a crack was first initiated at the tip of the web, and then the starter crack was carefully sub-critically grown until the ratio of dimensions a/h was greater than 1.5, as per equation (III) to accurately calculate stress intensity. At this point the crack length, a, was measured and recorded using a traveling microscope with 5 µm resolution. A drop of toluene was then placed into the crack groove and wicked along the length of groove by capillary forces, pinning the crack from moving until the fracture toughness is reached. The load was then increased until sample fracture occurred, and the critical stress intensity $K_{IC}$ calculated from the failure load and sample dimensions, with $K_P$ being equivalent to $K_{IC}$ due to the measurement method.

Figure 5:
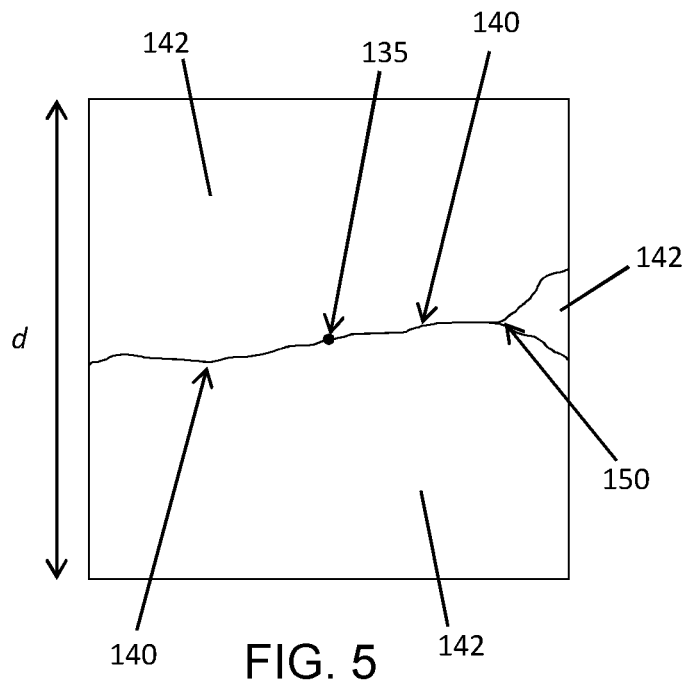
FIG. 5 is representation of a non-frangible sample after a frangibility test.

As utilized herein, a glass-based article is considered "non-frangible" when it exhibits at least one of the following in a test area as the result of a frangibility test: (1) four or less fragments with a largest dimension of at least 1 mm, and/or (2) the number of bifurcations is less than or equal to 1.5 bifurcations per crack branch. The fragments, bifurcations, and crack branches are counted based on any 5 cm by 5 cm square centered on the impact point. Thus, a glass is considered non-frangible if it meets one or both of tests (1) and (2) for any 5 cm by 5 cm square centered on the impact point where the breakage is created according to the procedure described below. In a frangibility test, an impact probe is brought in to contact with the glass, with the depth to which the impact probe extends into the glass increasing in successive contact iterations. The step-wise increase in depth of the impact probe allows the flaw produced by the impact probe to reach the tension region while preventing the application of excessive external force that would prevent the accurate determination of the frangible behavior of the glass. The glass-based article is placed on a steel surface such as a MVN precision vertical stage available from Newport Corporation. The impact probe is a stylus with a tungsten carbide tip (available from Fisher Scientific Industries, under the trademark TOSCO® and manufacturer identifying number #13-378, with a 60 degree coni-spherical tip), having a weight of 40 g, and is connected to a clamp on a gear driven mechanism that moves the stylus up and down. In one embodiment, the depth of the impact probe in the glass may increase by about 5 μm in each iteration, with the impact probe being removed from contact with the glass between each iteration. The test area is any 5 cm by 5 cm square centered at the impact point. FIG. 5 depicts a non-frangible test result. As shown in FIG. 5, the test area is a square that is centered at the impact point 135, where the length of a side of the square d is 5 cm. The non-frangible sample shown in FIG. 5 includes three fragments 142, and two crack branches 140 and a single bifurcation 150. Thus, the non-frangible sample shown in FIG. 5 contains less than 4 fragments having a largest dimension of at least 1 mm and the number of bifurcations is less than or equal to the number of crack branches (0.5 bifurcations per crack branch). As utilized herein, a crack branch originates at the impact point, and a fragment is considered to be within the test area if any part of the fragment extends into the test area. While coatings, adhesive layers, and the like may be used in conjunction with the strengthened glass-based articles described herein, such external restraints are not used in determining the frangibility or frangible behavior of the glass-based articles. In some embodiments, a film that does not impact the fracture behavior of the glass-based article may be applied to the glass-based article prior to the frangibility test to prevent the ejection of fragments from the glass-based article, increasing safety for the person performing the test.

Figure 6:
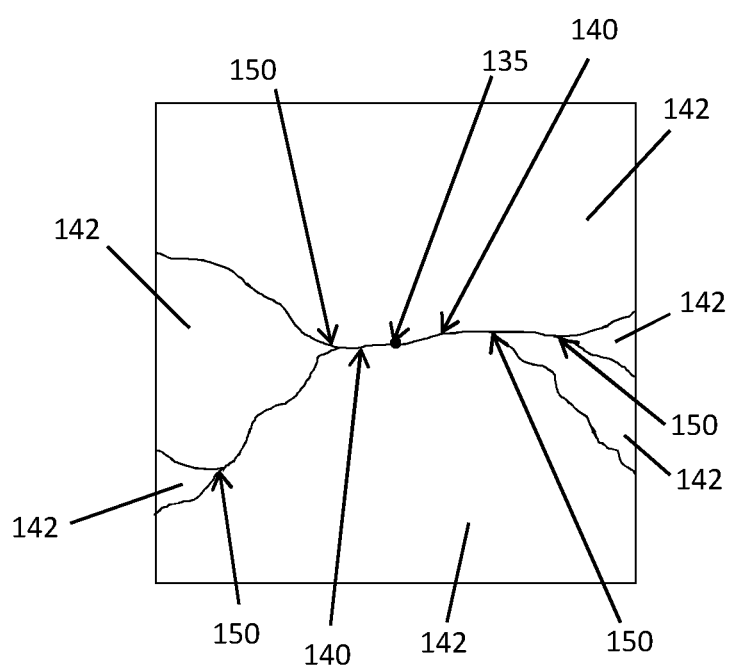
FIG. 6 is a representation of a frangible sample after a frangibility test.

A frangible sample is depicted in FIG. 6. The frangible sample includes 6 fragments 142 having a largest dimension of at least 1 mm. The sample depicted in FIG. 6 includes 2 crack branches 140 and 4 bifurcations 150, producing more bifurcations than crack branches (2 bifurcations per crack branch). Thus, the sample depicted in FIG. 6 does not exhibit four or less fragments or less than or equal to 1.5 bifurcations per crack branch. While FIGS. 5 and 5 include two crack branches 140 originating at the impact point 135, it is understood that more than two crack branches may originate at the impact point, such as three or more crack branches.

In the frangibility test described herein, the impact is delivered to the surface of the glass article with a force that is just sufficient to release the internally stored energy present within the strengthened glass article. That is, the point impact force is sufficient to create at least one new crack at the surface of the strengthened glass sheet and extend the crack through the compressive stress CS region (i.e., past the depth of compression) into the central tension region.

General Overview of Properties of Glass-Based Articles

Glass-based articles herein have stress profiles that are designed to increase probability of survival after multiple drops onto hard surfaces. High fracture toughness offers new higher levels of fracture resistance when combined with these advantageous stress profiles. The stress profiles may include a negative curvature region in a compressive stress layer, identified by having a negative second derivative, and may be characterized by a high degree of negative curvature, which contributes to the ability of the glass-based articles to survive multiple drops. Without wishing to be bound by any particular theory, the region of negative curvature may increase the amount of compressive stress in the glass-based articles at large depths, such as depths approaching the DOC.

The glass-based substrates utilized to form the glass-based articles with stress profiles described herein may be formed from any appropriate material, such as alkali aluminosilicate glasses. Alkali aluminosilicate glasses have good ion exchangeability, and chemical strengthening processes have been used to achieve high strength and high toughness properties in alkali aluminosilicate glasses. Sodium aluminosilicate glasses are highly ion exchangeable glasses with high glass formability and quality. Lithium aluminosilicate glasses are highly ion exchangeable glasses with high glass quality. The substitution of $Al_2O_3$ into the silicate glass network increases the interdiffusivity of monovalent cations during ion exchange. By chemical strengthening in a molten salt bath (e.g., $KNO_3$ and/or $NaNO_3$), glasses with high strength, high toughness, and high indentation cracking resistance can be achieved. The shape of the stress profiles achieved through chemical strengthening may impact the drop performance, strength, toughness, and other attributes of the glass-based articles.

Lithium aluminosilicate glasses are particularly desirable for the formation of chemically strengthened glass-based articles, as they provide good physical properties, chemical durability, and ion exchangeability. Through different ion exchange processes, greater peak tension (PT), depth of compression (DOC), and compressive stress (CS) can be achieved. The stress profiles described herein provide increased fracture resistance, and may be preferably applied to lithium containing glass-based articles.

In embodiments of glass compositions described herein, the concentration of constituent components (e.g., $SiO_2$, $Al_2O_3$, $Li_2O$, and the like) are given in mole percent (mol %) on an oxide basis, unless otherwise specified. It should be understood that any of the variously recited ranges of one component may be individually combined with any of the variously recited ranges for any other component.

The stress profiles disclosed herein exhibit increased fracture resistance, which may be characterized by improved performance in a drop test. With reference to FIG. 1, the glass has a first region under compressive stress (e.g., first and second compressive stress layers 120, 122 in FIG. 1) extending from the surface to a depth of compression (DOC) of the glass and a second region (e.g., central region 130 in FIG. 1) under a tensile stress or central tension (CT) extending from the DOC into the central or interior region of the glass.

The compressive stress (CS) has a maximum or peak value, which typically occurs at the surface of the glass (but such need not be the case as the peak may occur at a depth from the surface of the glass), and the CS varies with distance d from the surface according to a function. Referring again to FIG. 1, the first compressive stress layer 120 extends from first surface 110 to a depth $d_1$ and a second compressive stress layer 122 extends from second surface 112 to a depth $d_2$. Together, these segments define a compression or CS of glass 100.

The compressive stress of both major surfaces (110, 112 in FIG. 1) is balanced by stored tension in the central region (130) of the glass.

In the glass-based articles, there is an alkali metal oxide having a non-zero concentration that varies from one or both of first and second surfaces to a depth of layer (DOL) with respect to the metal oxide. A stress profile is generated due to the non-zero concentration of the metal oxide(s) that varies from the first surface. The non-zero concentration may vary along a portion of the article thickness. In some embodiments, the concentration of the alkali metal oxide is non-zero and varies, both along a thickness range from about 0·t to about 0.3·t. In some embodiments, the concentration of the alkali metal oxide is non-zero and varies along a thickness range from about 0·t to about 0.35·t, from about 0·t to about 0.4·t, from about 0·t to about 0.45·t, from about 0·t to about 0.48·t, or from about 0·t to about 0.50·t. The variation in concentration may be continuous along the above-referenced thickness ranges. Variation in concentration may include a change in metal oxide concentration of about 0.2 mol % or more along a thickness segment of about 100 micrometers. The change in metal oxide concentration may be about 0.3 mol % or more, about 0.4 mol % or more, or about 0.5 mol % or more along a thickness segment of about 100 micrometers. This change may be measured by known methods in the art including microprobe.

In some embodiments, the variation in concentration may be continuous along thickness segments in the range from about 10 micrometers to about 30 micrometers. In some embodiments, the concentration of the alkali metal oxide decreases from the first surface to a value between the first surface and the second surface and increases from the value to the second surface.

The concentration of alkali metal oxide may include more than one metal oxide (e.g., a combination of $Na_2O$ and $K_2O$). In some embodiments, where two metal oxides are utilized and where the radius of the ions differ from one or another, the concentration of ions having a larger radius is greater than the concentration of ions having a smaller radius at shallow depths, while at deeper depths, the concentration of ions having a smaller radius is greater than the concentration of ions having larger radius.

In one or more embodiments, the alkali metal oxide concentration gradient extends through a substantial portion of the thickness t of the article. In some embodiments, the concentration of the metal oxide may be about 0.5 mol % or greater (e.g., about 1 mol % or greater) along the entire thickness of the first and/or second section, and is greatest at a first surface and/or a second surface 0·t and decreases substantially constantly to a value between the first and second surfaces. At that value, the concentration of the metal oxide is the least along the entire thickness t; however, the concentration is also non-zero at that point. In other words, the non-zero concentration of that particular metal oxide extends along a substantial portion of the thickness t (as described herein) or the entire thickness t. The total concentration of the particular metal oxide in the glass-based article may be in the range from about 1 mol % to about 20 mol %.

The concentration of the alkali metal oxide may be determined from a baseline amount of the metal oxide in the glass-based substrate ion exchanged to form the glass-based article. The baseline amount of the metal oxide may be defined as the concentration of the metal oxide at the center of the glass-based article. The metal oxide ions added to the glass-based article as a result of the ion exchange treatment may be characterized with reference to the baseline amount. For example, the added amount of the metal oxide ions at the surface may be determined by subtracting the baseline amount from the amount measured at the surface.

In one or more embodiments, the glass-based article comprises a stress profile including a negative curvature region. The negative curvature region is located between the spike and the depth of compression. The curvature of the stress profile is given by the second derivative.

In embodiments, the stress profile includes a minimum of a second derivative value located within the region of greater than or equal to 0.025t to 0.25t that is less than or equal to −4000 MPa/mm², such as less than or equal to −5000 MPa/mm², less than or equal to −6000 MPa/mm², less than or equal to −7000 MPa/mm², less than or equal to −8000 MPa/mm², or less. In embodiments, the stress profile includes a minimum of a second derivative value located within the region of greater than or equal to 0.025t to 0.25t that is less than or equal to $$\frac{-2550}{\sqrt{t}} MPa/mm^2$$

where t is the thickness of the glass-based article in millimeters, such as less than or equal to $$\frac{-3200}{\sqrt{t}} MPa/mm^2,$$

less than or equal to $$\frac{-3800}{\sqrt{t}} MPa/mm^2,$$

less than or equal to $$\frac{-5100}{\sqrt{t}} MPa/mm^2,$$

or less. In embodiments, the minimum value of the second derivative within the region of greater than or equal to 0.025t to 0.25t is greater than or equal to −50000 MPa/mm², such as greater than or equal to −40000 MPa/mm², greater than or equal to −30000 MPa/mm², greater than or equal to −20000 MPa/mm², greater than or equal to −10000 MPa/mm², or more. In embodiments, the minimum value of the second derivative within the region of greater than or equal to 0.025t to 0.25t is greater than or equal to $$\frac{-32000}{\sqrt{t}} MPa/mm^2,$$

such as greater than or equal to $$\frac{-26000}{\sqrt{t}} MPa/mm^2,$$

greater than or equal to $$\frac{-20000}{\sqrt{t}} MPa/mm^2,$$

or more. The minimum value of the second derivative located within the region of greater than or equal to 0.025t to 0.25t may fall within a range formed between any of the aforementioned values. The low second derivative values in the 0.025t to 0.25t region correspond to higher amounts of stress in the region than profiles with higher second derivative values. The low second derivative values indicate that the region has a high degree of negative curvature. This negative curvature allows for more "area under the curve," and thereby more compressive stress, than for stress profiles that have no or positive curvature.

The second derivative values described herein are determined based on a polynomial fit of a measured stress profile. The polynomial fit is applied to the region of the stress profile extending from 1.3·$DOL_{sp}$ to 0.3t where t is the thickness of the glass-based article. The polynomial fit is selected such that the fit has a $R^2$ fit-quality value greater than 0.99, such as greater than or equal to 0.9995, greater than or equal to 0.9997, or greater than or equal to 0.9999. The fit is preferably a third-order polynomial. Where a third-order polynomial does not provide a $R^2$ fit-quality value greater than 0.99, a fourth-order polynomial may be utilized to achieve the necessary $R^2$ value. The second derivative of the stress profile in the region 1.3·$DOL_{sp}$ to 0.3t is then determined by calculating the second derivative of the polynomial fit in this region. For stress profiles that do not include a spike region, $DOL_{sp}$ is equal to 0 and the polynomial fit may be performed in the region of 0 to 0.3t.

In embodiments, the stress profile includes a curvature transition point, defined as a point with no curvature, in the region deeper than the spike and less than the depth of compression. The curvature transition point may indicate the transition from negative curvature to positive curvature, with the transition point itself having no curvature. The curvature transition point has a second derivative of 0 MPa/mm².

In embodiments, the curvature transition point is located within the region of greater than or equal to 0.025t to less than or equal to 0.25t, such as greater than or equal to 0.05t to less than or equal to 0.25t, greater than or equal to 0.10t to less than or equal to 0.24t, or greater than or equal to 0.15t to less than or equal to 0.23t. The curvature transition point may be located within the region of greater than or equal to 0.7·DOC to less than or equal to 0.25t., such as greater than or equal to 0.75·DOC to less than or equal to DOC, greater than or equal to 0.8·DOC to less than or equal to DOC, greater than or equal to 0.85·DOC to less than or equal to DOC. The curvature transition point may be located in a range formed between any of the aforementioned values. The high depth of the curvature transition point produces a stress profile with a negative curvature at greater depths in the glass-based article, which allows for a greater compressive stress in deep portions of the stress profile approaching the DOC. The higher compressive stress in deep portions of the stress profile may result in improved fracture resistance, as demonstrated by improved performance in drop testing.

In one more embodiments, the glass-based article comprises a peak tension (PT) that is greater than or equal to 70 MPa, such as greater than or equal to 75 MPa, greater than or equal to 80 MPa, greater than or equal to 85 MPa, greater than or equal to 90 MPa, greater than or equal to 95 MPa, greater than or equal to 100 MPa, greater than or equal to 105 MPa, greater than or equal to 110 MPa, greater than or equal to 115 MPa, or more. In embodiments, the PT of the glass-based article is less than or equal to 200 MPa, such as less than or equal to 190 MPa, less than or equal to 180 MPa, less than or equal to 170 MPa, less than or equal to 160 MPa, less than or equal to 150 MPa, less than or equal to 140 MPa, less than or equal to 130 MPa, less than or equal to 120 MPa, less than or equal to 110 MPa, or less. In embodiments, the PT of the glass-based article may be greater than or equal to $$\frac{62.6}{\sqrt{t}} MPa$$

where t is the thickness of the glass-based article in millimeters, such as greater than or equal to $$\frac{67}{\sqrt{t}} MPa,$$

greater than or equal to $$\frac{71.5}{\sqrt{t}} MPa,$$

greater than or equal to $$\frac{76}{\sqrt{t}} MPa,$$

greater than or equal to $$\frac{80.5}{\sqrt{t}} MPa,$$

greater than or equal to $$\frac{85.9}{\sqrt{t}} MPa,$$

greater man or equal to $$\frac{89}{\sqrt{t}} MPa,$$

or more. In embodiments, the PT of the glass-based article may be less than or equal to $$\frac{170}{\sqrt{t}} MPa$$

where t is the thickness of the glass-based article in millimeters, such as less than or equal to $$\frac{160}{\sqrt{t}} MPa,$$

less than or equal to $$\frac{150}{\sqrt{t}} MPa,$$

less man or equal to $$\frac{140}{\sqrt{t}} MPa,$$

less than or equal to $$\frac{130}{\sqrt{t}} MPa,$$

less than or equal $$\frac{120}{\sqrt{t}} MPa,$$

less than or equal to $$\frac{110}{\sqrt{t}} MPa,$$

less than or equal to $$\frac{100}{\sqrt{t}} MPa,$$

or less. The PT may fall within a range formed between any of the aforementioned values. The PT is correlated with the amount of compressive stress introduced into the glass-based article by the ion exchange treatment. Thus, higher PT values may indicate that more compressive stress has been imparted to the glass-based article, which may allow greater fracture resistance. If the PT value is too high, the glass-based articles may become frangible, which is undesirable for many applications.

In one or more embodiments, the glass-based substrates utilized to form the glass-based article have a fracture toughness ($K_{IC}$) of greater than or equal to 0.85 MPa√m, for example, greater than or equal to 0.86 MPa√m, greater than or equal to 0.87 MPa√m, greater than or equal to 0.88 MPa√m, greater than or equal to 0.89 MPa√m, greater than or equal to 0.90 MPa√m, greater than or equal to 0.91 MPa√m, greater than or equal to 0.92 MPa√m, 0.93 MPa√m, or more. In embodiments, the glass-based substrates utilized to form the glass-based article have a fracture toughness ($K_{IC}$) of less than or equal to 2 MPa√m, for example less than or equal to 1.5 MPa√m, less than or equal to 1.4 MPa√m, less than or equal to 1.3 MPa√m, less than or equal to 1.36 MPa√m, or less. The $K_{IC}$ may fall within a range formed between any of the aforementioned values. The $K_{IC}$ of the glass-based substrate utilized to form a glass-based article may be equivalent or approximated by the $K_{IC}$ of a glass-based substrate that has the same composition and structure as the center of the glass-based article. The high $K_{IC}$ of the glass-based substrate increases the resistant of the glass-based article to fracture, such as when dropped. Additionally, without wishing to be bound by any particular theory, the high $K_{IC}$ of the glass-based substrates described herein may allow the glass-based articles to have stress profiles with higher peak tension values without becoming frangible.

In one or more embodiments, the glass-based article comprises a peak compressive stress ($CS_{max}$) that is greater than or equal to 330 MPa, such as greater than or equal to 400 MPa, greater than or equal to 500 MPa, greater than or equal to 600 MPa, or more. In embodiments, the $CS_{max}$ is less than or equal to 1 GPa, such as less than or equal to 900 MPa, less than or equal to 800 MPa, less than or equal to 700 MPa, less than or equal to 650 MPa, or less. The $CS_{max}$ may fall within a range formed between any of the aforementioned values. The peak compressive stress may be located at or near the surface of the glass-based article.

In one or more embodiments, the glass-based article comprises a compressive stress at a knee ($CS_k$) that is greater than or equal to 80 MPa, such as greater than or equal to 85 MPa, greater than or equal to 90 MPa, greater than or equal to 95 MPa, greater than or equal to 100 MPa, greater than or equal to 105 MPa, greater than or equal to 110 MPa, greater than or equal to 115 MPa, greater than or equal to 120 MPa, greater than or equal to 130 MPa, greater than or equal to 140 MPa, or more. In embodiments, the $CS_k$ is greater than or equal to $$\frac{71.5}{\sqrt{t}} MPa$$

where t is me thickness of the glass-based article in millimeters, such as greater than or equal to $$\frac{71.6}{\sqrt{t}} MPa,$$

greater than or equal to greater than or equal to $$\frac{76}{\sqrt{t}} MPa,$$

greater than or equal to $$\frac{80.5}{\sqrt{t}} MPa,$$

greater than or equal to $$\frac{85}{\sqrt{t}} MPa,$$

greater than or equal to $$\frac{89.4}{\sqrt{t}} MPa,$$

greater than or equal to $$\frac{94}{\sqrt{t}} MPa,$$

greater than or equal to $$\frac{98.4}{\sqrt{t}} MPa,$$

greater than or equal to $$\frac{103}{\sqrt{t}} MPa,$$

greater than or equal to $$\frac{107.3}{\sqrt{t}} MPa,$$

or more. In embodiments, the $CS_k$ is less than or equal to 200 MPa, such as less than or equal to 190 MPa, less than or equal to 180 MPa, less than or equal to 170 MPa, less than or equal to 160 MPa, less than or equal to 150 MPa, or less. In embodiments, the $CS_k$ is less than or equal to $$\frac{200}{\sqrt{t}} MPa$$

where t is the thickness of the glass-based article in millimeters, or less. The $CS_k$ may fall within a range formed between any of the aforementioned values. The high levels of $CS_k$ are correlated with protection against fracture by the mechanism of sharp-damage introduction combined with bending of the glass-based article simultaneously or after the sharp-damage introduction, such as experienced with a drop on a rough surface.

The stress profiles described herein may be characterized by high levels of compressive stress at depths approaching the depth of compression. In embodiments, the glass-based articles have a compressive stress at a depth of 0.6·DOC from the first surface of greater than or equal to 45 MPa, such as greater than or equal to 50 MPa, greater than or equal to 55 MPa, or greater than or equal to 59 MPa. In embodiments, the glass-based articles have a compressive stress at a depth of 0.65·DOC from the first surface of greater than or equal to 40 MPa, such as greater than or equal to 45 MPa, greater than or equal to 50 MPa, or greater than or equal to 55 MPa. In embodiments, the glass-based articles have a compressive stress at a depth of 0.7·DOC from the first surface of greater than or equal to 37 MPa, such as greater than or equal to 41 MPa, or greater than or equal to 45 MPa. In embodiments, the glass-based articles have a compressive stress at a depth of 0.75·DOC from the first surface of greater than or equal to 32 MPa, such as greater than or equal to 35 MPa, or greater than or equal to 38 MPa. In embodiments, the glass-based articles have a compressive stress at a depth of 0.8·DOC from the first surface of greater than or equal to 26 MPa, such as greater than or equal to 29 MPa, or greater than or equal to 32 MPa. In embodiments, the glass-based articles have a compressive stress at a depth of 0.85·DOC from the first surface of greater than or equal to 18 MPa, such as greater than or equal to 20 MPa, or greater than or equal to 23 MPa. In embodiments, the glass-based articles have a compressive stress at a depth of 0.9·DOC from the first surface of greater than or equal to 11 MPa, such as greater than or equal to 13 MPa, or greater than or equal to 15 MPa. The high compressive stress in deep portions of the stress profile may result in improved fracture resistance, as demonstrated by improved performance in drop testing.

In one or more embodiments, the glass-based article comprises a depth of compression (DOC) that is greater than or equal to 0.15t where t is the thickness of the glass-based article, such as greater than or equal to 0.16t, greater than or equal to 0.17t, greater than or equal to 0.18t, greater than or equal to 0.19t, greater than or equal to 0.20t, greater than or equal to 0.21t, greater than or equal to 0.22t, greater than or equal to 0.23t, or more. In embodiments, the DOC is greater than or equal to 130 µm, such as greater than or equal to 140 µm, greater than or equal to 150 µm, greater than or equal to 160 µm, greater than or equal to 170 µm, greater than or equal to 180 µm, or more. In embodiments, the DOC is less than or equal to 0.30t where t is the thickness of the glass-based article, such as less than or equal to 0.29t, less than or equal to 0.28t, less than or equal to 0.27t, less than or equal to 0.26t, less than or equal to 0.25t, less than or equal to 0.24t, or less. In embodiments, the DOC is less than or equal to 300 MPa, such as less than or equal to 250 MPa, less than or equal to 200 MPa, or less. The DOC may fall within a range formed between any of the aforementioned values.

In one or more embodiments, the glass-based article comprises a spike depth of layer ($DOL_{sp}$) that is greater than or equal to 0.003t where t is the thickness of the glass-based article, such as greater than or equal to 0.004t, greater than or equal to 0.005t, greater than or equal to 0.006t, greater than or equal to 0.007t, greater than or equal to 0.008t, greater than or equal to 0.009t, greater than or equal to 0.01t, or more. In embodiments, the $DOL_{sp}$ is greater than or equal to 3 µm, such as greater than or equal to 3.5 µm, greater than or equal to 4 µm, greater than or equal to 4.5 µm, greater than or equal to 5 µm, greater than or equal to 5.5 µm, or more. In embodiments, the $DOL_{sp}$ is less than or equal to 15 µm, such as less than or equal to 14 µm, less than or equal to 13 µm, less than or equal to 12 µm, less than or equal to 11 µm, or less. The $DOL_{sp}$ may fall within a range formed between any of the aforementioned values.

The stress profiles described herein may have a local maximum in the absolute value of the slope near the DOC. In embodiments, the stress profile has a local maximum of an absolute value of the slope located within 0.1·DOC of the DOC, such as within 0.09·DOC of the DOC, within 0.08·DOC of the DOC, within 0.07·DOC of the DOC, within 0.06·DOC of the DOC, within 0.05·DOC of the DOC, within 0.04·DOC of the DOC, within 0.03·DOC of the DOC, within 0.02·DOC of the DOC, within 0.01·DOC of the DOC, or at the DOC. The slope of the stress profile may be calculated based on the polynomial fit described above, with the slope being given by the derivative of the fitted polynomial. The local maximum in the absolute value of the slope of the stress profile near the DOC indicates that the compressive stress is high at depths approaching the DOC. The increased compressive stress at large depths may provide increased fracture resistance, as indicated by improved drop performance. In some embodiments, a local maximum of the absolute value of the slope of the stress profile may be located at a curvature transition point.

The glass-based articles may have any appropriate thickness. In one or more embodiments, the glass-based article has a thickness (t) of greater than or equal to 0.2 mm to less than or equal to 2.0 mm, such as greater than or equal to 0.3 mm to less than or equal to 1.0 mm, greater than or equal to 0.4 mm to less than or equal to 0.9 mm, greater than or equal to 0.5 mm to less than or equal to 0.8 mm, greater than or equal to 0.6 mm to less than or equal to 0.7 mm. In embodiments, the glass-based article may have a thickness (t) of about 0.75 mm. The thickness (t) may fall within a range formed between any of the aforementioned values. The thickness of the glass-based articles may be determined by the thickness of the glass-based substrates utilized to produce the glass-based articles. In embodiments, the glass-based article may have a thickness that is less than the thickness of the glass-based substrate utilized to form the glass-based article due to post-IOX processing, such as surface polishing or etching.

In one or more embodiments, a center of the glass-based article comprises a $Li_2O/Na_2O$ molar ratio that is greater than or equal to 3.3, such as greater than or equal to 4, greater than or equal to 5, greater than or equal to 6, or more. In embodiments, a center of the glass-based article comprises a $Li_2O/Na_2O$ molar ratio that is less than or equal to 100, such as less than or equal to 60, or more. The $Li_2O/Na_2O$ molar ratio at the center of the glass-based article may fall within a range formed between any of the aforementioned values. The $Li_2O/Na_2O$ molar ratio at the center of the glass-based article may be equivalent to the $Li_2O/Na_2O$ molar ratio of the glass-based substrate utilized to form the glass-based article.

The glass-based articles may include $Li_2O$. In one or more embodiments, a center of the glass-based article comprises a $Li_2O$ molar concentration that is greater than or equal to 8 mol %, such as greater than or equal to 8.5 mol %, greater than or equal to 9 mol %, greater than or equal to 9.5 mol %, greater than or equal to 10 mol %, greater than or equal to 10.5 mol %, greater than or equal to 11 mol %, greater than or equal to 11.5 mol %, or more.

In embodiments, the glass-based articles described herein are non-frangible. Without wishing to be bound by any particular theory, the non-frangible nature of the glass-based substrates may be due at least in part to the shape of the stress profile and the high fracture toughness of the glass-based substrates utilized to form the glass-based articles, especially when the high peak tension of the stress profiles is considered. The shape of the stress profile is at least in part characterized by the negative curvature region described above. By way of example, previously known glass-based articles with peak tension values in the range of the stress profiles described herein were frangible.

In embodiments, the stress profiles of the glass-based articles may have a tensile-stress factor ($K_T$) greater than or equal to 1.41 MPa·$\sqrt{m}$, such as greater than or equal to 1.45 MPa·$\sqrt{m}$, greater than or equal to 1.49 MPa·$\sqrt{m}$, greater than or equal to 1.50 MPa·$\sqrt{m}$, or more. The glass-based articles exhibiting these $K_T$ values may also be non-frangible. As utilized herein, the tensile-stress factor ($K_T$) given by the equation:

$$K_T = \sqrt{\int_{DOC_1}^{DOC_2} \sigma^2(z)dz}$$

where $\sigma$ is the stress represented by one of the in-plane components (as the in-plane components are presumed to be equal), and z is the position in the thickness direction. To obtain the values of $K_T$ in units of MPa$\sqrt{m}$, the stress values under the integral should be in MPa, while the thickness position scale z should be in m. The polynomial fit of the stress profile in the tension region utilized to calculate the $K_T$ value may be produced similarly to the description above with regard to the second derivative. The high tensile stress factors of the stress profiles described herein indicate the amount of stress imparted to the glass-based articles by the ion exchange treatment and may be impacted by the shape of the stress profile in the tension region.

The glass-based articles described herein may also be characterized by the amount of potassium added to the glass-based substrate during the ion exchange process. The glass-based articles may have a maximum $K_2O$ concentration increase over the $K_2O$ concentration at the center of the glass-based article that is less than or equal to 7.5 mol %, such as less than or equal to 7.0 mol %, less than or equal to 6.5 mol %, less than or equal to 6.0 mol %, less than or equal to 5.5 mol %, or less. The glass-based articles may have a maximum $K_2O$ concentration increase over the $K_2O$ concentration at the center of the glass-based article that is greater than or equal to 1.5 mol %, such as greater than or equal to 2.0 mol %, greater than or equal to 3.0 mol %, greater than or equal to 4.0 mol %, greater than or equal to 4.5 mol %, or more. The maximum $K_2O$ concentration increase over the $K_2O$ concentration at the center of the glass-based article may fall within a range of any of the aforementioned values. The $K_2O$ concentration in the spike may increase the resistance of the glass-based articles to the formation of lateral cracks during scratching, in addition to the resistance to fracture provided by the high compressive stress in the spike.

In embodiments, the glass-based article may have an average $K_2O$ concentration increase over the $K_2O$ concentration at the center of the glass-based article in the first 1 µm from the surface that is less than or equal to 6.7 mol %, such as less than or equal to 6.2 mol %, less than or equal to 5.7 mol %, less than or equal to 5.3 mol %, less than or equal to 4.9 mol %, or less. In embodiments, the glass-based article may have an average $K_2O$ concentration increase over the $K_2O$ concentration at the center of the glass-based article in the first 1 µm from the surface that is greater than or equal to 1.0 mol %, such as greater than or equal to 2.0 mol %, greater than or equal to 3.0 mol %, or more. The average $K_2O$ concentration increase over the $K_2O$ concentration at the center of the glass-based article in the first 1 µm from the surface may fall within a range of any of the aforementioned values.

In embodiments, the glass-based article may have an average $K_2O$ concentration increase over the $K_2O$ concentration at the center of the glass-based article in the first 1.5 µm from the surface that is less than or equal to 6.3 mol %, such as less than or equal to 5.8 mol %, less than or equal to 5.3 mol %, less than or equal to 4.9 mol %, less than or equal to 4.6 mol %, or less. In embodiments, the glass-based article may have an average $K_2O$ concentration increase over the $K_2O$ concentration at the center of the glass-based article in the first 1.5 µm from the surface that is greater than or equal to 1.0 mol %, such as greater than or equal to 2.0 mol %, greater than or equal to 3.0 mol %, or more. The average $K_2O$ concentration increase over the $K_2O$ concentration at the center of the glass-based article in the first 1.5 µm from the surface may fall within a range of any of the aforementioned values.

In embodiments, the glass-based article may have an average $K_2O$ concentration increase over the $K_2O$ concentration at the center of the glass-based article in the first 2 µm from the surface that is less than or equal to 5.9 mol %, such as less than or equal to 5.4 mol %, less than or equal to 4.9 mol %, less than or equal to 4.5 mol %, less than or equal to 4.1 mol %, or less. In embodiments, the glass-based article may have an average $K_2O$ concentration increase over the $K_2O$ concentration at the center of the glass-based article in the first 2 µm from the surface that is greater than or equal to 1.0 mol %, such as greater than or equal to 2.0 mol %, greater than or equal to 3.0 mol %, or more. The average $K_2O$ concentration increase over the $K_2O$ concentration at the center of the glass-based article in the first 2 µm from the surface may fall within a range of any of the aforementioned values.

The $K_2O$ concentration in the spike region may be characterized by the integral of the $K_2O$ concentration increase over $K_2O$ concentration at the center of the glass-based article in the spike region. In embodiments, the integral of the $K_2O$ concentration increase over $K_2O$ concentration at the center of the glass-based article in the spike region is less than or equal to 29 mol %·µm, such as less than or equal to 25 mol %·µm, less than or equal to 20 mol %·µm, less than or equal to 16 mol %·µm, less than or equal to 12 mol %·µm, or less. In embodiments, the integral of the $K_2O$ concentration increase over $K_2O$ concentration at the center of the glass-based article in the spike region is greater than or equal to 4 mol %·µm, such as greater than or equal to 6 mol %·µm, greater than or equal to 8 mol %·µm, or more. The integral of the $K_2O$ concentration increase over $K_2O$ concentration at the center of the glass-based article in the spike region may fall within a range of any of the aforementioned values.

The glass-based articles described herein may be characterized by a $Na_2O$ concentration profile. In embodiments, the region of greater than or equal to 0.025t to less than or equal to 0.25t of the glass-based article has a $Na_2O$ concentration profile with a positive curvature or no curvature. Stated differently, in embodiments the region of greater than or equal to 0.025t to less than or equal to 0.25t of the glass-based article has a $Na_2O$ concentration profile that does not have a negative curvature.

The glass articles with the stress profiles described herein offer the advantage of overall improvement in fracture resistance when considering several failure modes simultaneously—overstress from drops on smooth hard surfaces (such as those suppressed by using a surface compression spike with a high CS and a deep $DOL_{sp}$), deep damage introduction with failure from flaw extension to the central tension region (such as those suppressed by having an increased DOC), and damage introduction to intermediate depths combined with simultaneous or subsequent bending (such as those suppressed by having a high compressive stress at intermediate and larger depths). The stress profiles described herein may also be produced with fast IOX times when lithium containing glass-based substrates are employed.

The glass-based articles may be characterized by any or all of the attributes and features described herein. For example, a stress profile of the type described herein may be characterized by any combination of the attributes described herein.

Glass-Based Substrates

Examples of glasses that may be used as substrates may include alkali-alumino silicate glass compositions or alkali-containing aluminoborosilicate glass compositions, though other glass compositions are contemplated. Specific examples of glass-based substrates that may be used include but are not limited to an alkali-alumino silicate glass, an alkali-containing borosilicate glass, an alkali-alumino borosilicate glass, an alkali-containing lithium alumino silicate glass, or an alkali-containing phosphate glass. The glass-based substrates have base compositions that may be characterized as ion exchangeable. As used herein, "ion exchangeable" means that a substrate comprising the composition is capable of exchanging cations located at or near the surface of the substrate with cations of the same valence that are either larger or smaller in size. In one or more embodiments, glass-based substrates may include a lithium-containing aluminosilicate.

In embodiments, the glass-based substrates may be formed from any composition capable of forming the stress profiles. In some embodiments, the glass-based substrates may be formed from the glass compositions described in U.S. patent application Ser. No. 16/370,002 titled "Glasses Having High Fracture Toughness," filed Mar. 29, 2019, the entirety of which is incorporated herein by reference.

In embodiments, the glass-based substrates may be formed from a composition including: 50 mol % to 69 mol % $SiO_2$; 12.5 mol % to 25 mol % $Al_2O_3$; 0 mol % to 8 mol % $B_2O_3$; greater than 0 mol % to 4 mol % CaO; greater than 0 mol % to 17.5 mol % MgO; 0.5 mol % to 8 mol % $Na_2O$; 0 mol % to 2.5 mol % $La_2O_3$; and greater than 8 mol % to 18 mol % $Li_2O$; wherein: $(Li_2O+Na_2O+MgO)/Al_2O_3$ is from 0.9 to less than 1.3; and $Al_2O_3+MgO+Li_2O+ZrO_2+La_2O_3+Y_2O_3$ is from greater than 23 mol % to less than 50 mol %.

In embodiments, the glass-based substrates may be formed from a composition including $SiO_2$; $Al_2O_3$; and $Li_2O$, wherein the glass is characterized by a $K_{IC}$ value of at greater than or equal to 0.85 MPa√m.

Stress profiles having the desirable attributes described herein could potentially be obtained in lithium-free Na-containing glasses by a two-step ion exchange in baths with different ratios of Na and K. However, in such cases the ion exchange is long, on the order of days, and the fracture toughness of the glass composition is lower. Thus, lithium containing glass-based substrates are preferred for producing glass-based articles with the desired stress profiles.

The glass-based substrates may include $Li_2O$. In one or more embodiments, the glass-based substrate comprises a $Li_2O$ molar concentration that is greater than or equal to 8 mol %, such as greater than or equal to 8.5 mol %, greater than or equal to 9 mol %, greater than or equal to 9.5 mol %, greater than or equal to 10 mol %, greater than or equal to 10.5 mol %, greater than or equal to 11 mol %, greater than or equal to 11.5 mol %, or more. The inclusion of $Li_2O$ in the glass-based substrate may increase the fracture toughness of the glass-based substrate and may decrease the time required to produce the desired stress profiles through ion exchange.

The glass-based substrate may be characterized by the manner in which it may be formed. For instance, the glass-based substrates may be characterized as float-formable (i.e., formed by a float process), down-drawable and, in particular, fusion-formable or slot-drawable (i.e., formed by a down draw process such as a fusion draw process or a slot draw process).

Some embodiments of the glass-based substrates described herein may be formed by a down-draw process. Down-draw processes produce glass-based substrates having a uniform thickness that possess relatively pristine surfaces. Because the average flexural strength of the glass article is controlled by the amount and size of surface flaws, a pristine surface that has had minimal contact has a higher initial strength. In addition, down drawn glass articles have a very flat, smooth surface that can be used in its final application without costly grinding and polishing.

Some embodiments of the glass-based substrates may be described as fusion-formable (i.e., formable using a fusion draw process). The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass article. The fusion draw method offers the advantage that, because the two glass films flowing over the channel fuse together, neither of the outside surfaces of the resulting glass article comes in contact with any part of the apparatus. Thus, the surface properties of the fusion drawn glass article are not affected by such contact.

Some embodiments of the glass-based substrates described herein may be formed by a slot draw process. The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous glass article and into an annealing region.

In some embodiments, the glass-based substrates described herein may be formed using a roll-forming process. For example, a roll-forming process may be utilized to produce glass-based substrates with relatively uniform thicknesses.

In one or more embodiments, the glass-based substrates described herein may exhibit an amorphous microstructure and may be substantially free of crystals or crystallites. In other words, the glass-base substrates articles exclude glass-ceramic materials in some embodiments.

Ion Exchange (IOX) Treatment

Chemical strengthening of glass-based substrates having base compositions is done by placing the ion-exchangeable glass-based substrates in a molten bath containing cations (e.g., $K^+$, $Na^+$, $Ag^+$, etc.) that diffuse into the glass while the smaller alkali ions (e.g., $Na^+$, $Li^+$) of the glass diffuse out into the molten bath. The replacement of the smaller cations by larger ones creates compressive stresses near the top surface of the glass-based articles. Tensile stresses are generated in the interior of the glass-based articles that balance the near-surface compressive stresses.

With respect to ion exchange processes, they may independently be a thermal-diffusion process or an electro-diffusion process. Non-limiting examples of ion exchange processes in which a glass-based substrate is immersed in multiple ion exchange baths, with washing and/or annealing steps between immersions, are described in U.S. Pat. No. 8,561,429, by Douglas C. Allan et al., issued on Oct. 22, 2013, entitled "Glass with Compressive Surface for Consumer Applications," and claiming priority from U.S. Provisional Patent Application No. 61/079,995, filed Jul. 11, 2008, in which glass is strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass is strengthened by ion exchange in a first bath diluted with an effluent ion, followed by immersion in a second bath having a smaller concentration of the effluent ion than the first bath. The contents of U.S. Pat. Nos. 8,561,429 and 8,312,739 are incorporated herein by reference in their entireties.

The baths utilized for the ion exchange treatment of the glass-based substrates to form the glass-based articles disclosed herein may include a mixture of salts. For example, the ion exchange bath may include a mixture of sodium nitrate and potassium nitrate, without the inclusion of lithium nitrate. In other embodiments, the ion exchange bath may include a mixture of sodium nitrate, potassium nitrate, and lithium nitrate. The bath may also include silicic acid, such as in an amount of about 0.5 wt % of the total amount of the nitrates.

The ion exchange treatment is preferably conducted in a single step. For example, a single ion exchange bath may be utilized to produce the glass-based article. In embodiments, a multi-step ion exchange process may be employed to form the glass-based articles, such as an ion exchange treatment with two or more bath treatments.

After an ion exchange process is performed, it should be understood that a composition at the surface of a glass-based article is different than the composition of the as-formed glass-based substrate. This results from one type of alkali metal ion in the as-formed glass, such as, for example $Li^+$ or $Na^+$, being replaced with larger alkali metal ions, such as, for example $Na^+$ or $K^+$, respectively. However, the composition at or near the center of the depth of the glass-based article will, in embodiments, still be the same as the composition of the as-formed glass-based substrate.

End Products

Figure 4A:
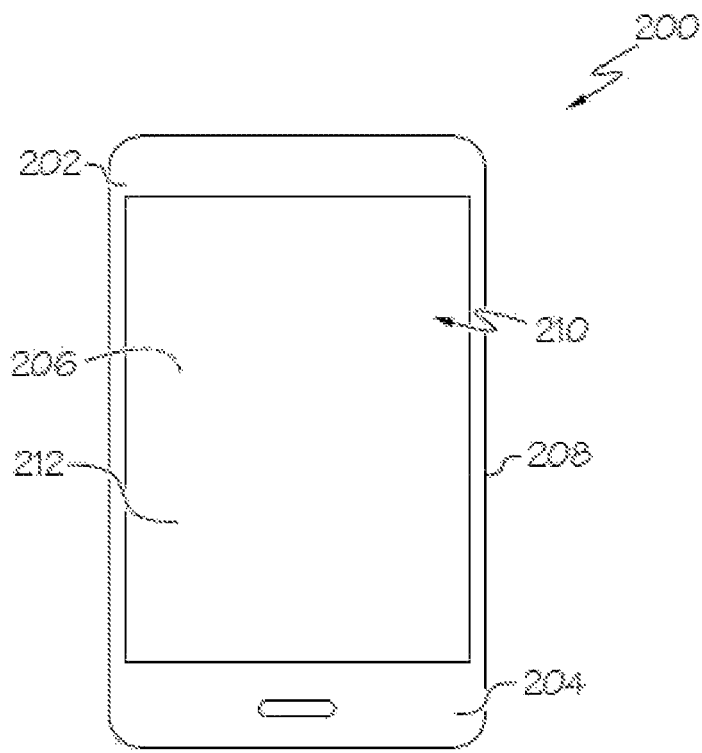
FIG. 4A is a plan view of an exemplary electronic device incorporating any of the glass articles disclosed herein.
Figure 4B:
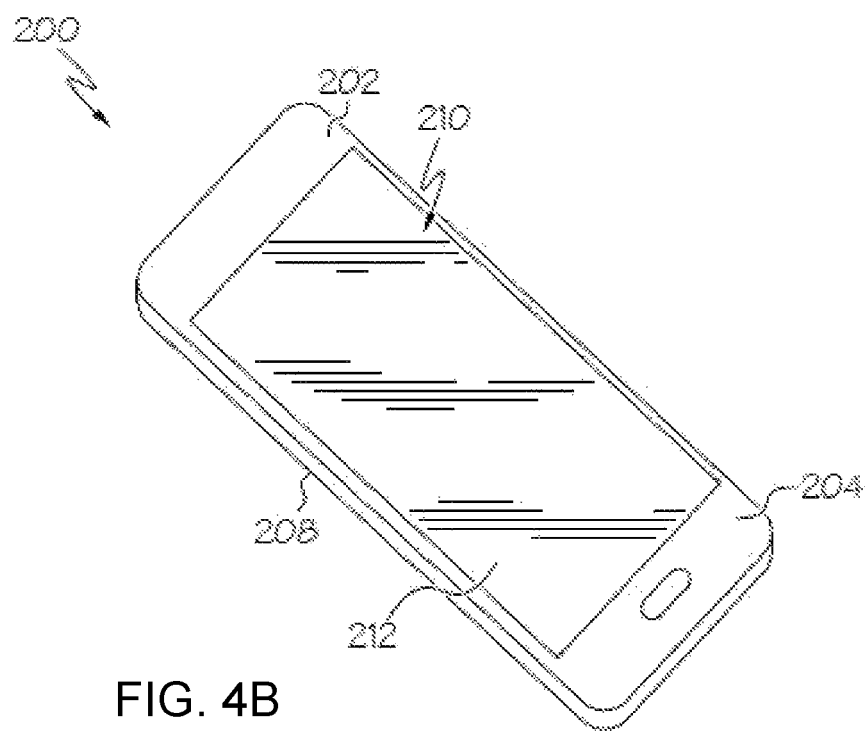
FIG. 4B is a perspective view of the exemplary electronic device of FIG. 4A.

The glass-based articles disclosed herein may be incorporated into another article such as an article with a display (or display articles) (e.g., consumer electronics, including mobile phones, tablets, computers, navigation systems, and the like), architectural articles, transportation articles (e.g., automobiles, trains, aircraft, sea craft, etc.), appliance articles, or any article that requires some transparency, scratch-resistance, abrasion resistance or a combination thereof. An exemplary article incorporating any of the glass articles disclosed herein is shown in FIGS. 4A and 4B. Specifically, FIGS. 4A and 4B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, the cover substrate 212 may include any of the glass articles disclosed herein.

EXAMPLES

Embodiments will be further clarified by the following examples. It should be understood that these examples are not limiting to the embodiments described above.

Glass-substrates were formed having a composition of 58.35 mol % $SiO_2$, 17.81 mol % $Al_2O_3$, 6.07 mol % $B_2O_3$, 1.73 mol % $Na_2O$, 0.20 mol % $K_2O$, 10.74 mol % $Li_2O$, 4.43 mol % $MgO$, 0.57 mol % $CaO$, and 0.08 mol % $SnO_2$.

Example 1

Figure 7:
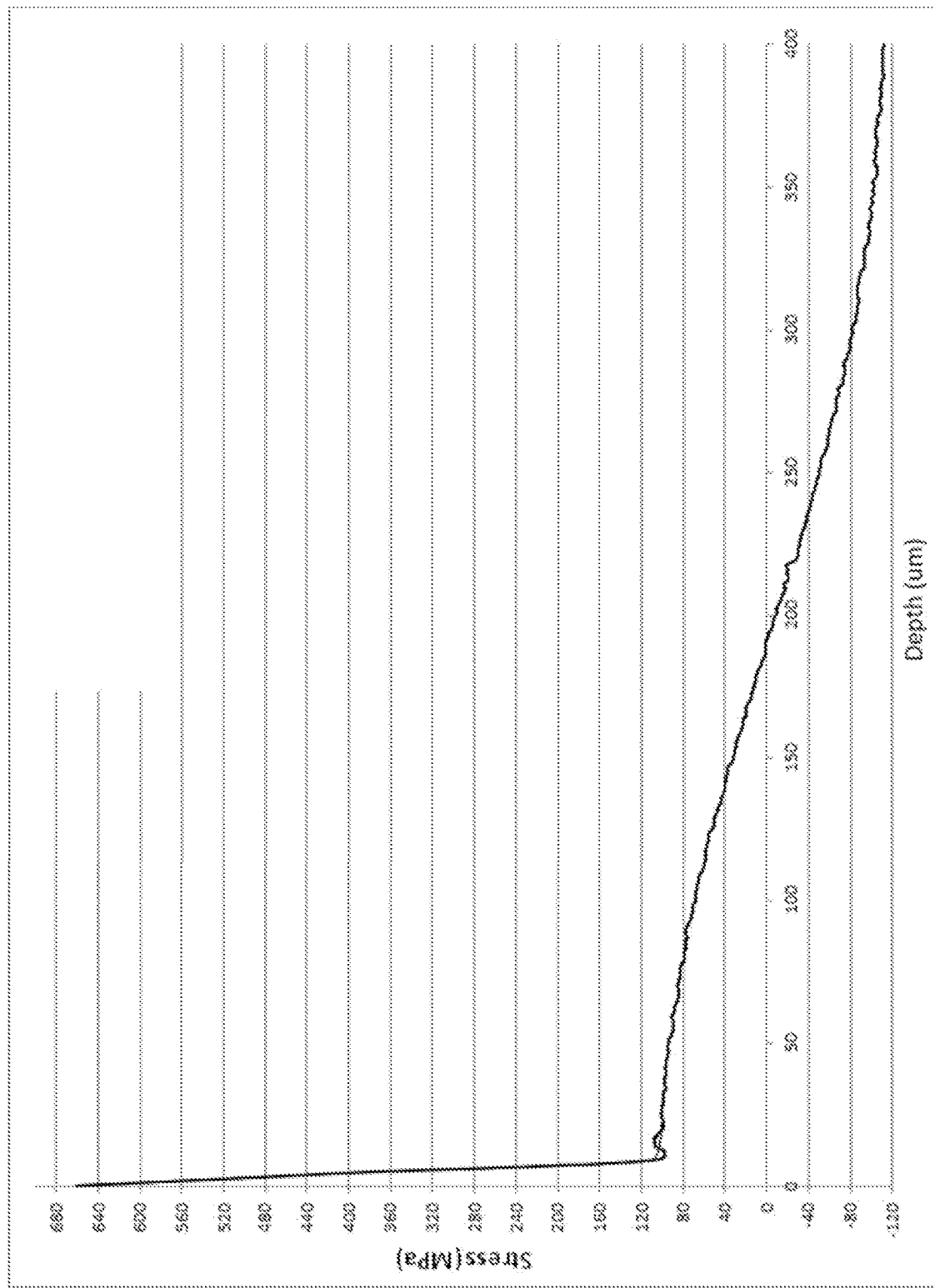
FIG. 7 is a plot of stress profile according to an embodiment.

A glass-based substrate with a thickness of 0.8 mm was subjected to ion exchange in a bath containing 7 wt % $NaNO_3$ and 93 wt % $KNO_3$, with substantially no $LiNO_3$ for a period of 12 hours to form the glass-based article of Example 1. The bath was maintained at temperature of 450° C., and silicic acid was added to the bath at a level of 0.5% of the total weight of the nitrates. The stress profile of Example 1 is shown in FIG. 7. The stress profile of Example 1 is substantially symmetric. Example 1 has a DOC of 189.5 μm (0.237t). The stress profile was non-frangible.

Figure 8:
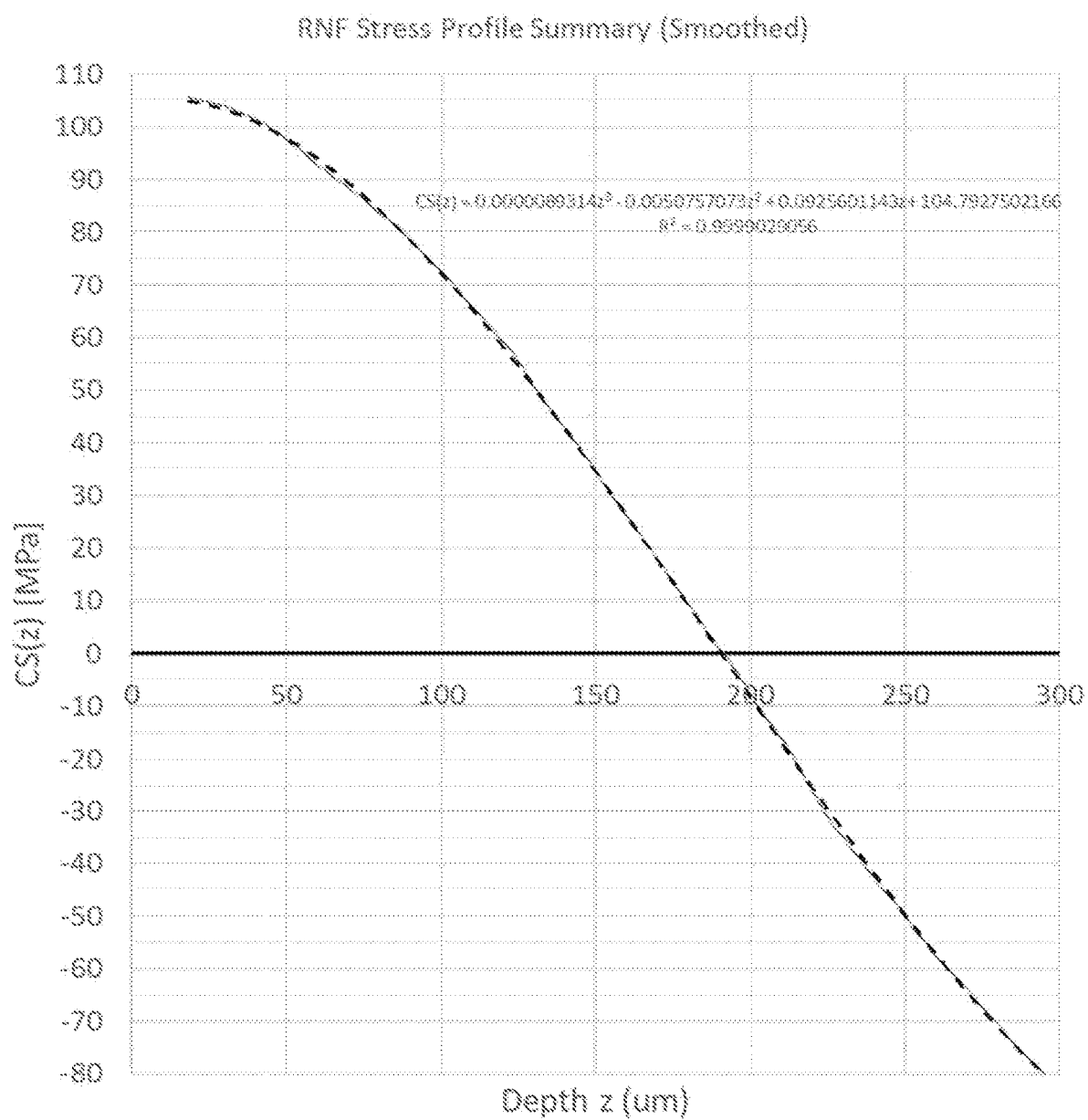
FIG. 8 is a plot of a portion of the stress profile of FIG. 7 including a polynomial fit.

FIG. 8 shows a deep portion of the measured stress profile of Example 1, and a third-order polynomial fit (dotted line). Prior to performing the polynomial fit the measure stress profile was smoothed using a LOESS smoothing algorithm. The polynomial fit was performed in the depth region of 19 µm to 300 µm to avoid oscillations at the base of the spike in the measured stress profile. The oscillation is an artifact of the RNF stress profile extraction method, and not a feature of the stress profile.

Figure 9:
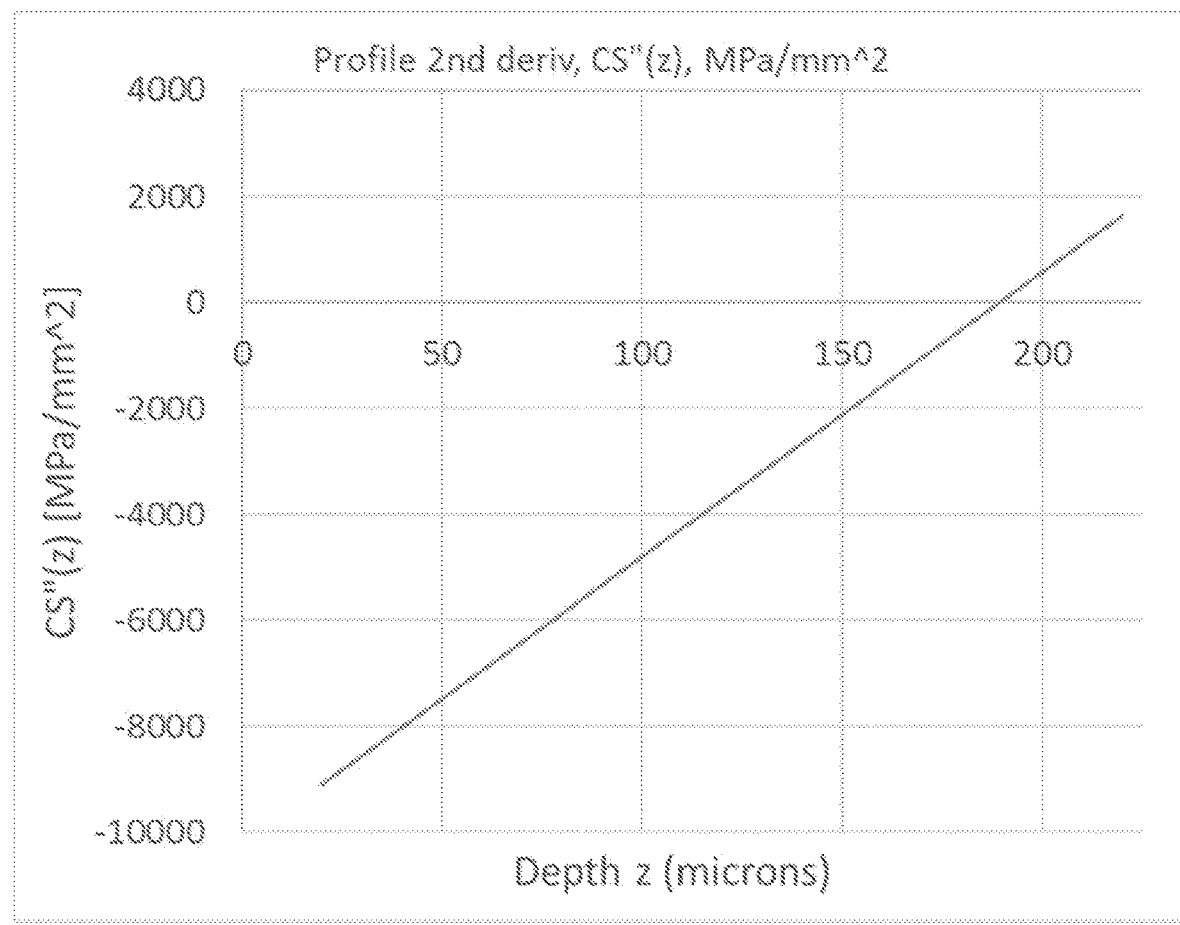
FIG. 9 is a plot of the second derivative of the polynomial fit of FIG. 8.

FIG. 9 is a plot of the second derivative of the polynomial fit of FIG. 8. As shown in FIG. 9, the second derivative has a value of zero, indicating a curvature transition point, at 189.5 µm (0.237t), or about the depth of compression. The minimum value of the second derivative in FIG. 9 is −9080 MPa/mm$^2$, and occurs at the minimum depth calculated.

Example 2

Figure 10:
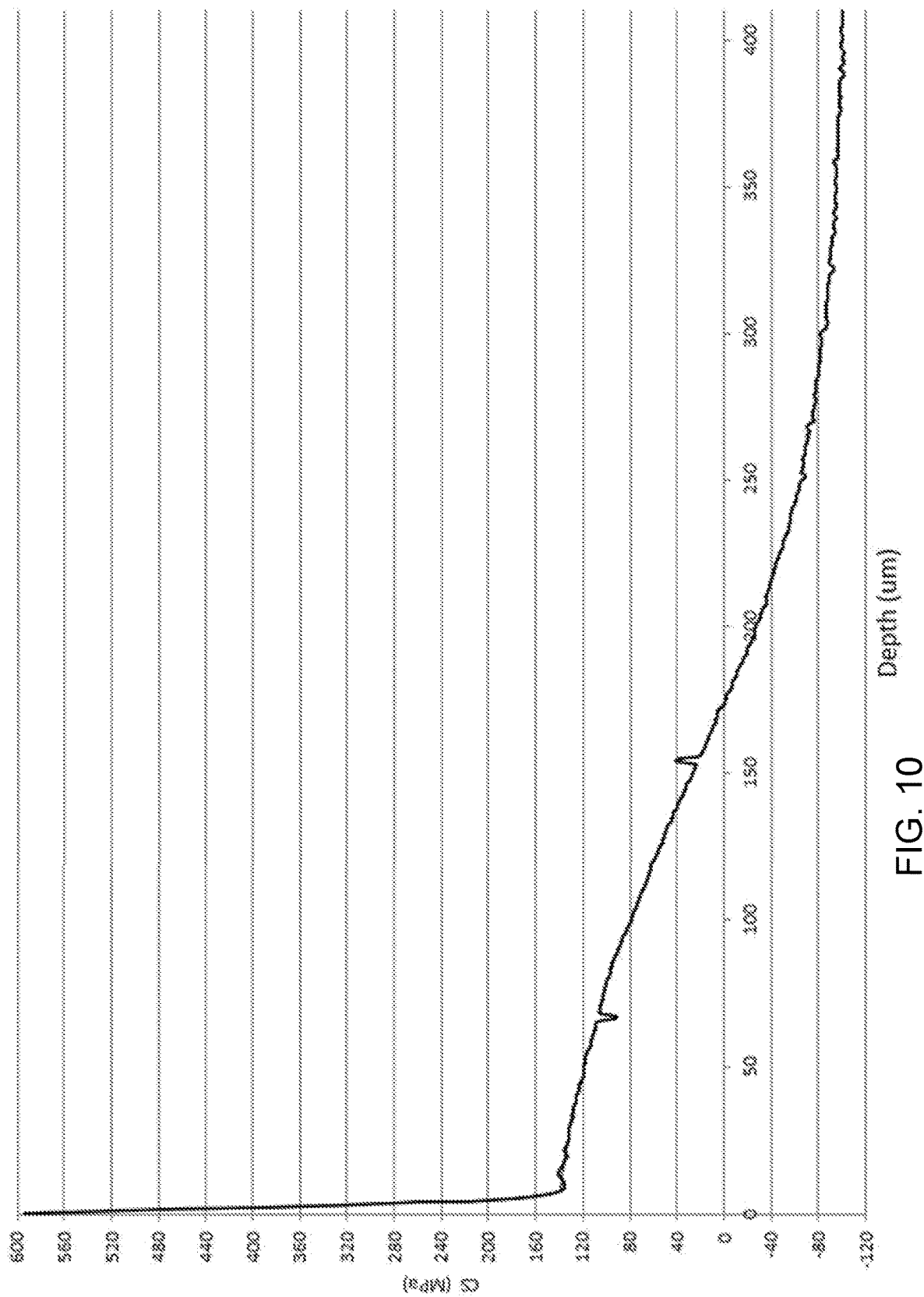
FIG. 10 is a plot of stress profile according to an embodiment.

A glass-based substrate with a thickness of 0.81 mm was subjected to ion exchange in a bath containing 2 wt % LiNO$_3$, 12 wt % NaNO$_3$, and 86 wt % KNO$_3$ for a period of 8.4 hours to form the glass-based article of Example 2. The bath was maintained at temperature of 450° C., and silicic acid was added to the bath at a level of 0.5% of the total weight of the nitrates. The stress profile of Example 2 is shown in FIG. 10. The stress profile of Example 2 is substantially symmetric. Example 2 has a DOC of 174 µm (0.215t, a CS$_{max}$ of 603 MPa, a DOL$_{sp}$ of 5.41 µm, a CS$_k$ of 141.2 MPa, a PT of 101.9 MPa located at the center of the glass-based article. The compressive stress region depth integral was 15.896 MPa·mm in each compressive stress region, and the compressive stress depth integral in the first 10 µm was 2.686 MPa·mm. The stress profile was non-frangible.

Figure 11:
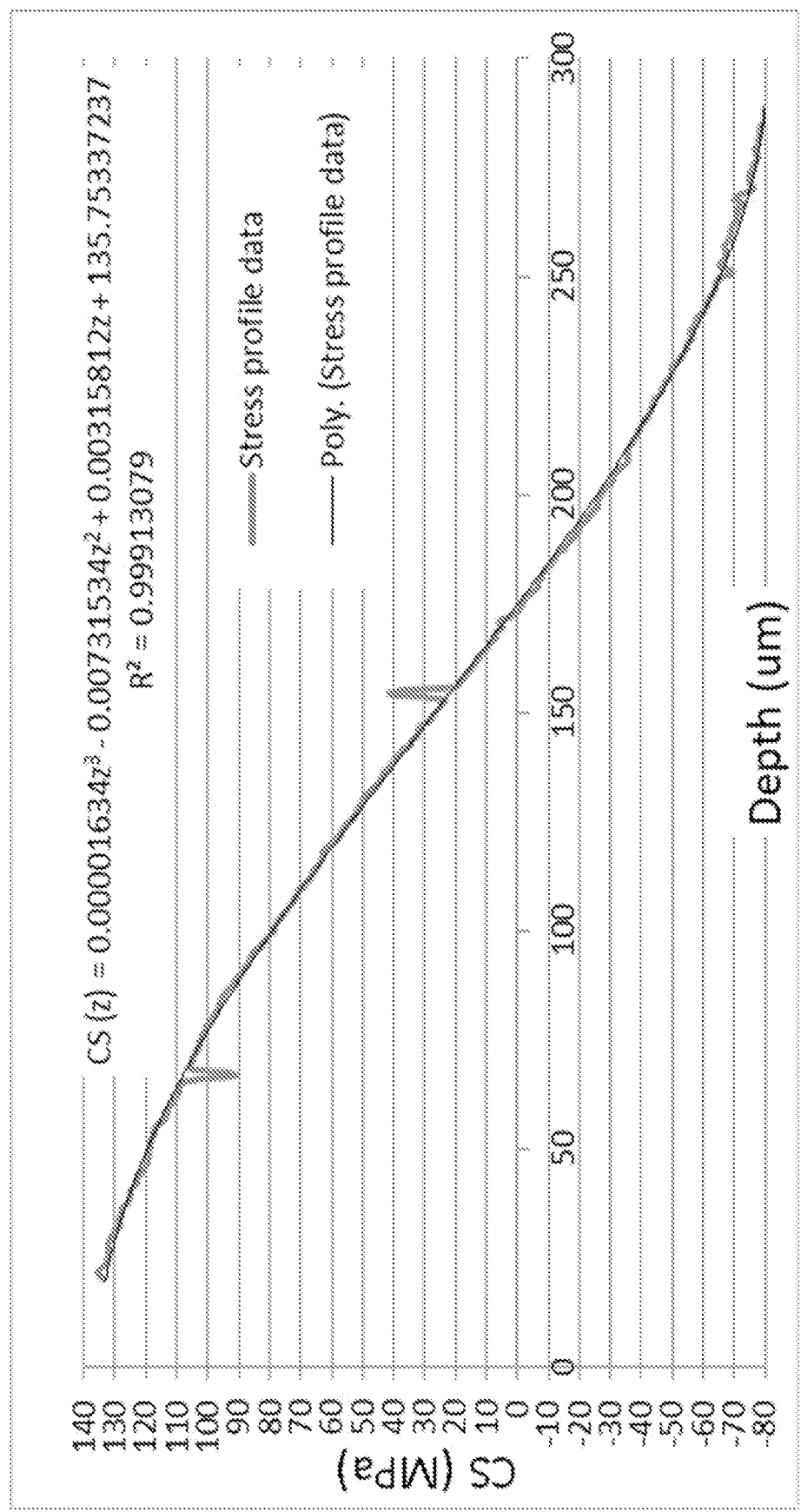
FIG. 11 is a plot of a portion of the stress profile of FIG. 10 including a polynomial fit.

FIG. 11 shows a deep portion of the measured stress profile of Example 2, and a third-order polynomial fit. Prior to performing the polynomial fit the measure stress profile was smoothed using a LOESS smoothing algorithm. The polynomial fit was performed in the depth region of 20 µm to 220 µm.

Figure 12:
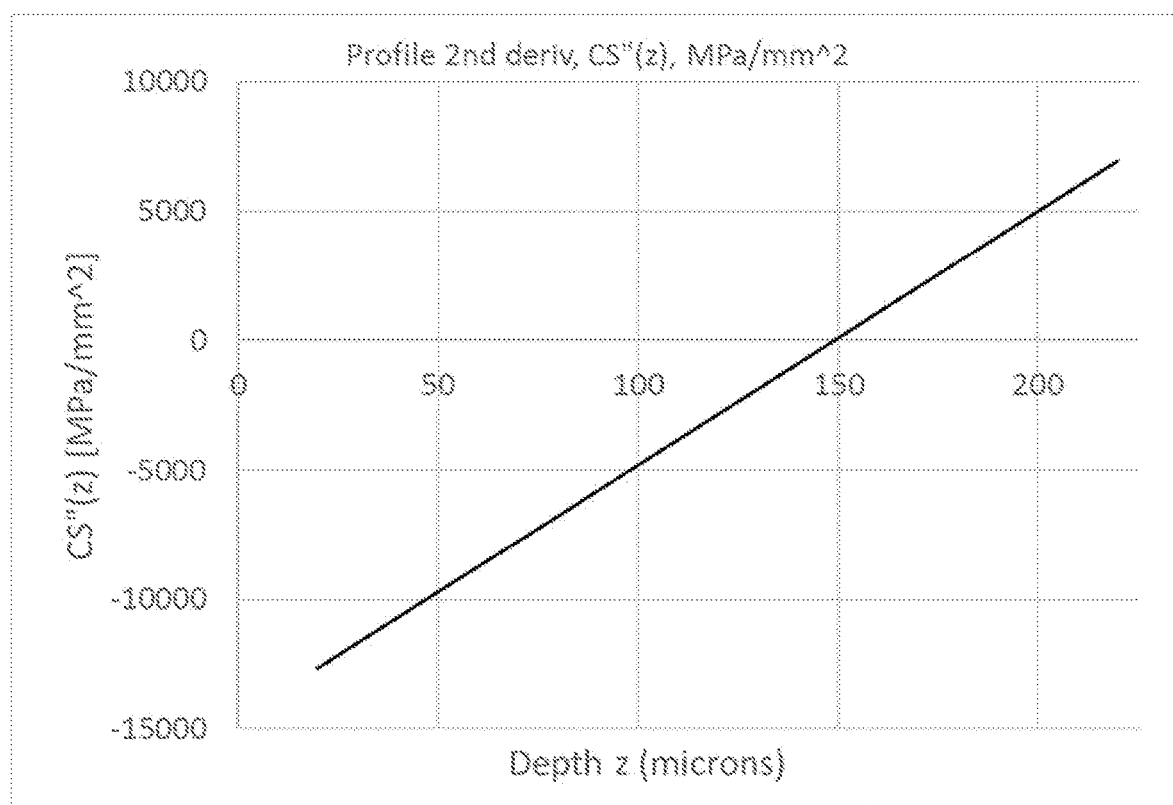
FIG. 12 is a plot of the second derivative of the polynomial fit of FIG. 11.

FIG. 12 is a plot of the second derivative of the polynomial fit of FIG. 11. As shown in FIG. 12, the second derivative has a value of zero, indicating a curvature transition point, at 149.2 µm (0.857·DOC; 0.184t). The minimum value of the second derivative in FIG. 12 is −12670 MPa/mm$^2$, and occurs at the minimum depth calculated.

Example 3

Figure 13:
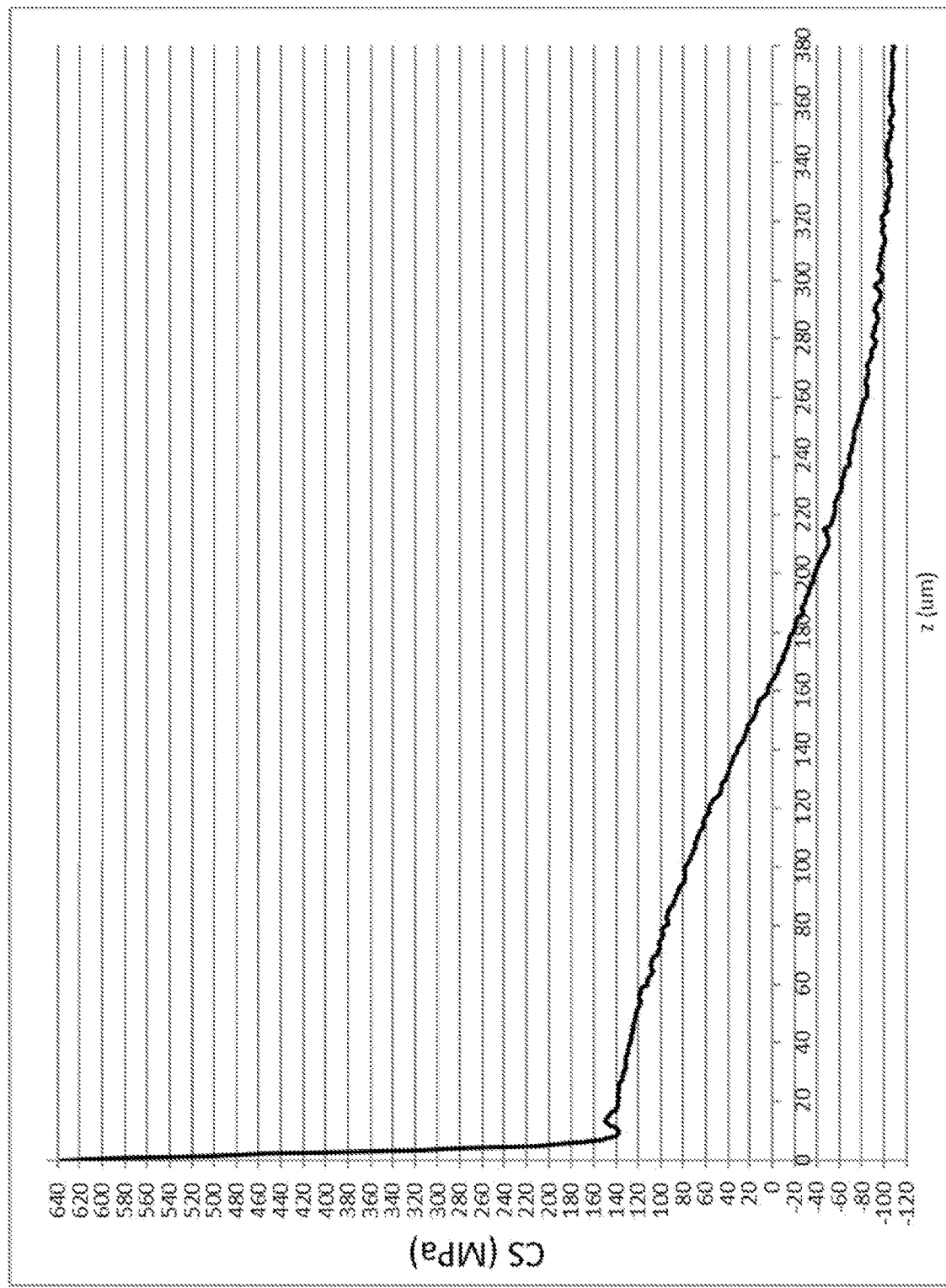
FIG. 13 is a plot of stress profile according to an embodiment.

A glass-based substrate with a thickness of 0.761 mm was subjected to ion exchange in a bath containing 1.2 wt % LiNO$_3$, 10 wt % NaNO$_3$, and 88.8 wt % KNO$_3$ for a period of 8.4 hours to form the glass-based article of Example 3. The bath was maintained at temperature of 447° C., and silicic acid was added to the bath at a level of 0.5% of the total weight of the nitrates. The stress profile of Example 3 is shown in FIG. 13. The stress profile of Example 3 is substantially symmetric. Example 3 has a DOC of 164 µm (0.2155t), a CS$_{max}$ of 646 MPa, a DOL$_{sp}$ of 5.41 µm, a CS$_k$ of 156 MPa, a PT of 108 MPa located at the center of the glass-based article. The compressive stress region depth integral was 15.753 MPa·mm (20.7t) in each compressive stress region, and the compressive stress depth integral in the first 10 µm was 2.9 MPa·mm (3.8t). The stress profile was non-frangible.

Figure 14:
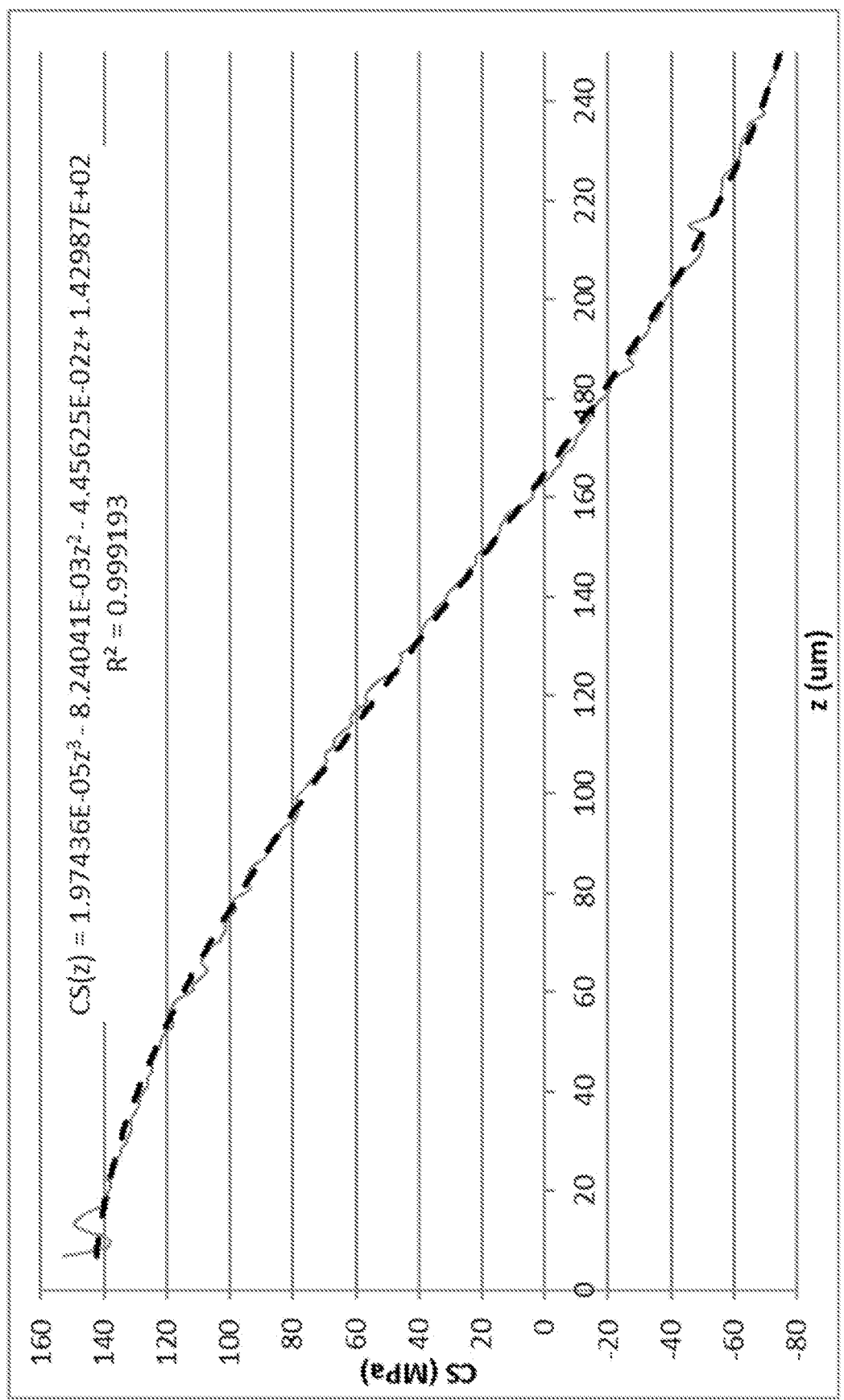
FIG. 14 is a plot of a portion of the stress profile of FIG. 13 including a polynomial fit.

FIG. 14 shows a deep portion of the measured stress profile of Example 3, and a third-order polynomial fit (dotted line). Prior to performing the polynomial fit the measure stress profile was smoothed using a LOESS smoothing algorithm. The polynomial fit was performed in the depth region of 7 µm to 250 µm.

Figure 15:
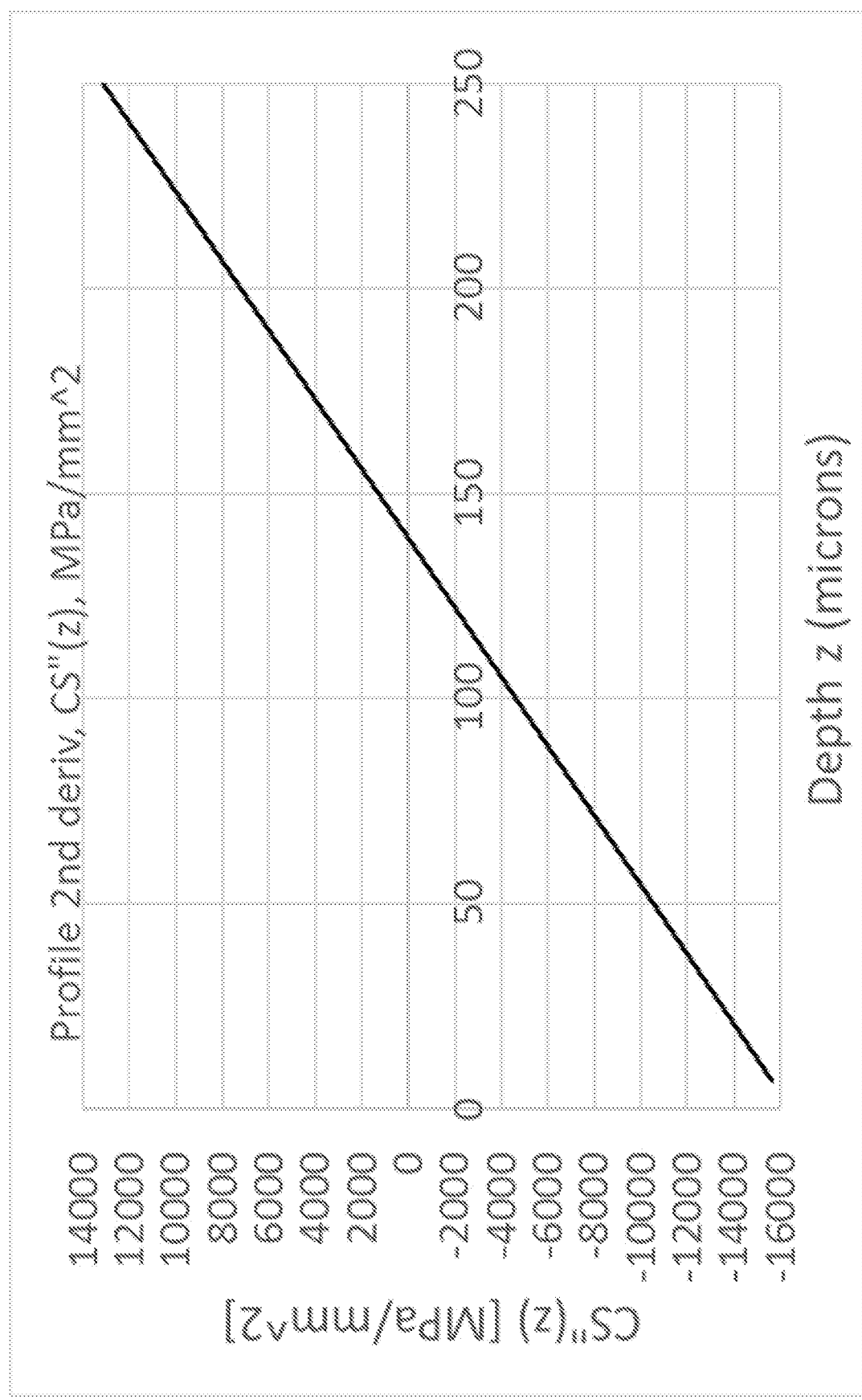
FIG. 15 is a plot of the second derivative of the polynomial fit of FIG. 14.

FIG. 15 is a plot of the second derivative of the polynomial fit of FIG. 14. As shown in FIG. 15, the second derivative has a value of zero, indicating a curvature transition point, at 139.3 µm (0.85·DOC; 0.183t). The minimum value of the second derivative in FIG. 15 is −15651 MPa/mm$^2$, and occurs at the minimum depth calculated.

Example 4

Figure 16:
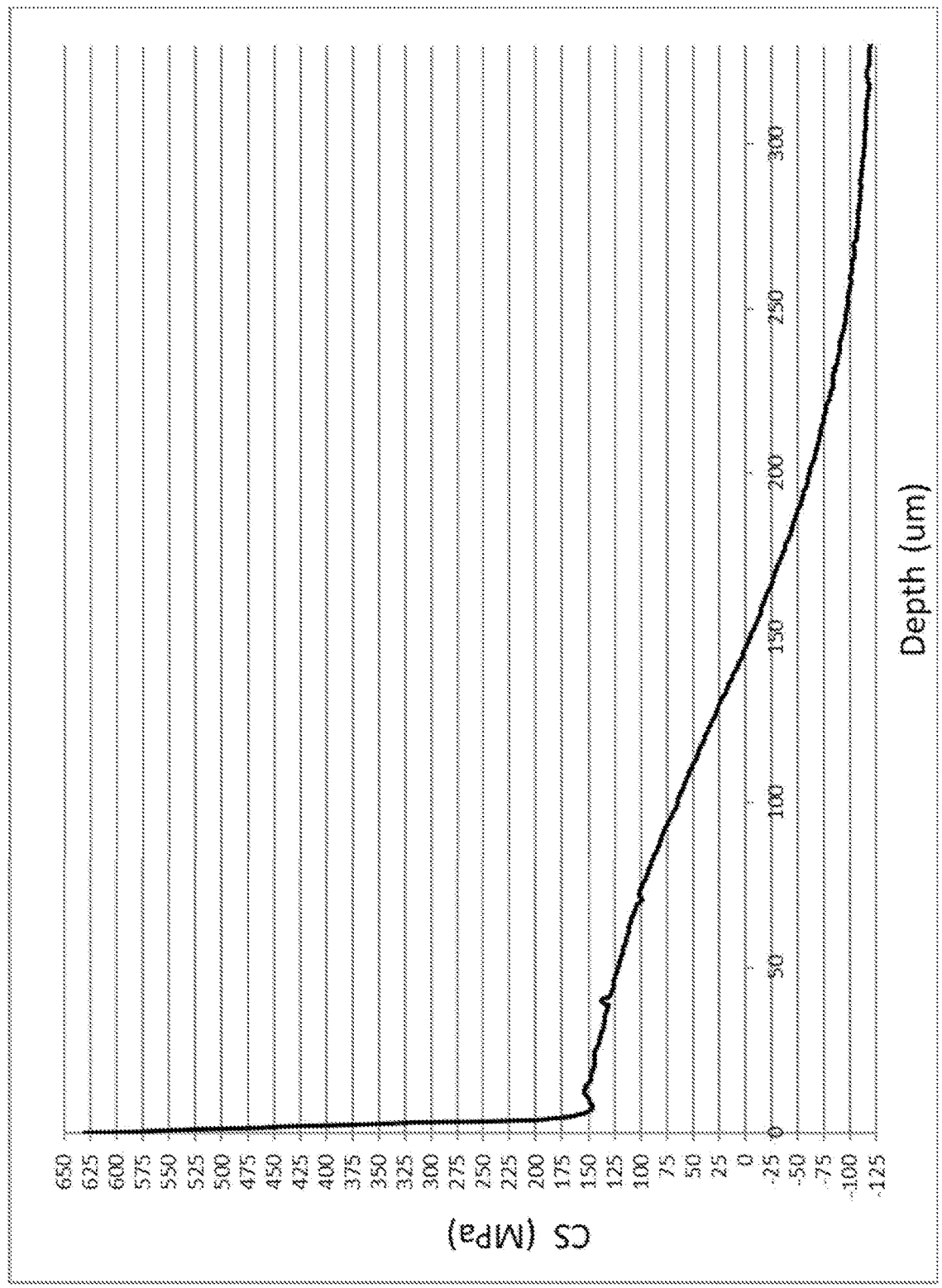
FIG. 16 is a plot of stress profile according to an embodiment.

A glass-based substrate with a thickness of 0.658 mm was subjected to ion exchange in a bath containing 1.2 wt % LiNO$_3$, 10 wt % NaNO$_3$, and 88.8 wt % KNO$_3$ for a period of 7 hours to form the glass-based article of Example 4. The bath was maintained at temperature of 447° C., and silicic acid was added to the bath at a level of 0.5% of the total weight of the nitrates. The stress profile of Example 4 is shown in FIG. 16. The stress profile of Example 4 is substantially symmetric. Example 4 has a DOC of 149 µm (0.226t), a CS$_{max}$ of 640 MPa, a DOL$_{sp}$ of 4.96 µm, a CS$_k$ of 152 MPa, a PT of 121 MPa located at the center of the glass-based article. The compressive stress region depth integral was 14.5 MPa·mm (22.04t) in each compressive stress region, and the compressive stress depth integral in the first 10 µm was 2.54 MPa·mm (3.86t). The stress profile was non-frangible.

Figure 17:
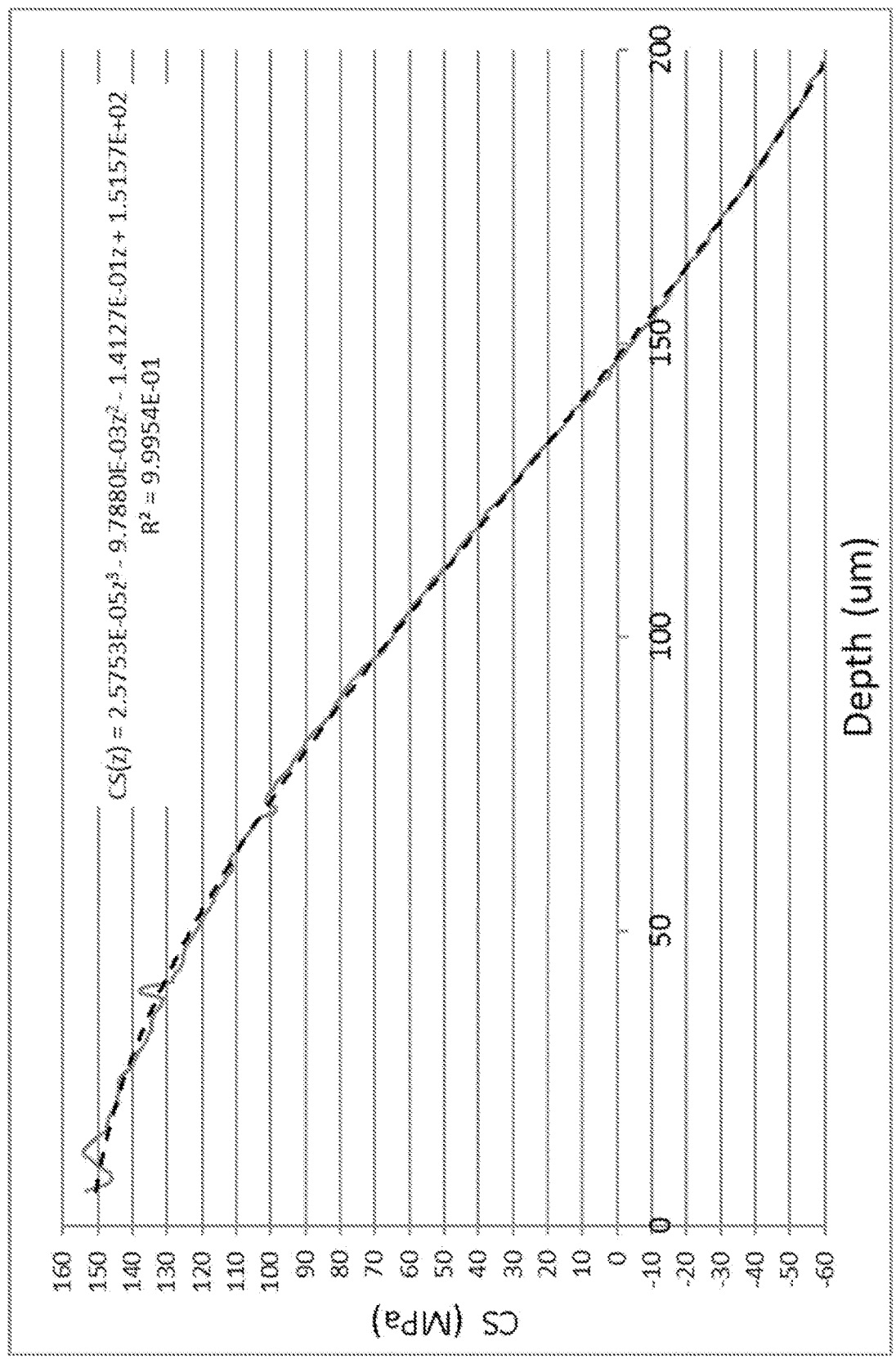
FIG. 17 is a plot of a portion of the stress profile of FIG. 16 including a polynomial fit.

FIG. 17 shows a deep portion of the measured stress profile of Example 4, and a third-order polynomial fit (dotted line). Prior to performing the polynomial fit the measure stress profile was smoothed using a LOESS smoothing algorithm. The polynomial fit was performed in the depth region of 5 µm to 198 µm (0.3t).

Figure 18:
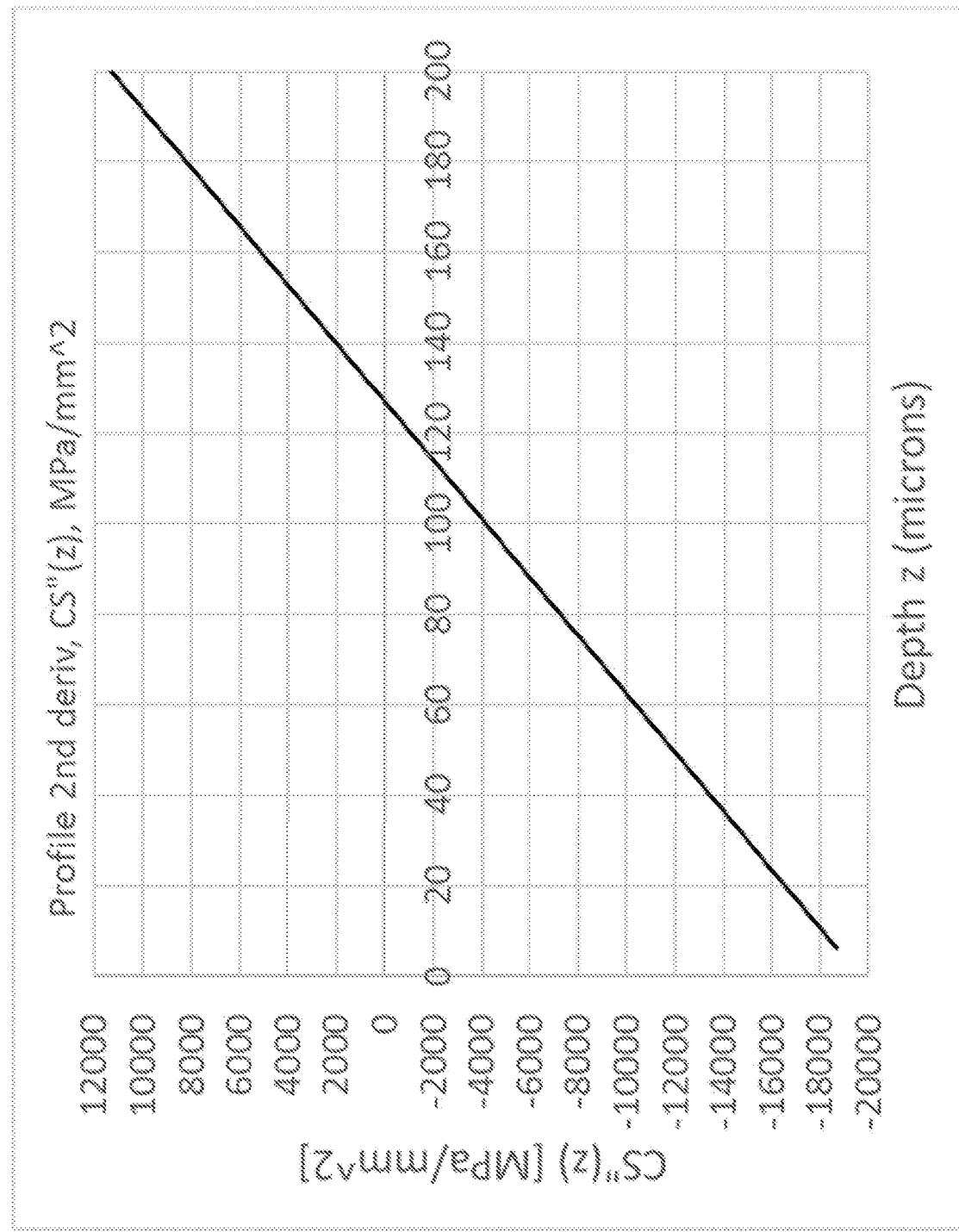
FIG. 18 is a plot of the second derivative of the polynomial fit of FIG. 17.

FIG. 18 is a plot of the second derivative of the polynomial fit of FIG. 17. As shown in FIG. 18, the second derivative has a value of zero, indicating a curvature transition point, at 127 µm (0.853·DOC; 0.193t). The minimum value of the second derivative in FIG. 18 is −17026 MPa/mm$^2$, and occurs at a depth of 16.5 µm. A maximum absolute value of the negative slope of a deep portion of the stress profile of FIG. 16 is 1.381 MPa/µm at a depth of 127 µm. The slope of the stress profile at the DOC is −1.34 MPa/µm.

Example 5

Figure 19:
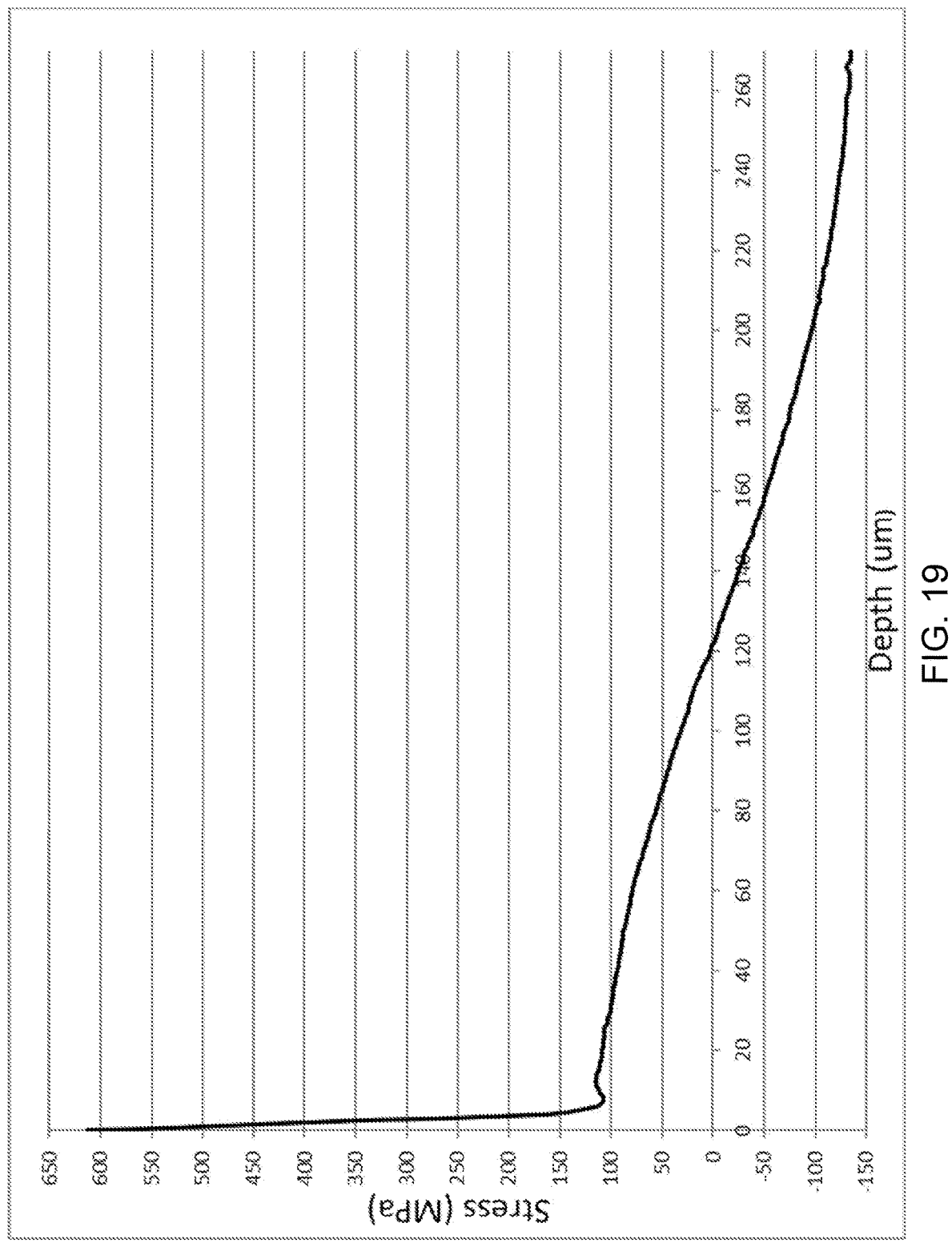
FIG. 19 is a plot of stress profile according to an embodiment.

A glass-based substrate with a thickness of 0.538 mm was subjected to ion exchange in a bath containing 1.2 wt % LiNO$_3$, 10 wt % NaNO$_3$, and 88.8 wt % KNO$_3$ for a period of 7 hours to form the glass-based article of Example 5. The bath was maintained at temperature of 447° C., and silicic acid was added to the bath at a level of 0.5% of the total weight of the nitrates. The stress profile of Example 5 is shown in FIG. 19. The stress profile of Example 5 is substantially symmetric. Example 5 has a DOC of 123 μm (0.226t), a $CS_{max}$ of 621 MPa, a $DOL_{sp}$ of 4.8 μm, a $CS_k$ in the range of 120 MPa to 130 MPa, a PT of 134.9 MPa located at the center of the glass-based article. The compressive stress region depth integral was 9.78 MPa·mm (18.2t) in each compressive stress region, and the compressive stress depth integral in the first 10 μm was 2.3 MPa·mm (4.3t). The stress profile was non-frangible.

Figure 20:
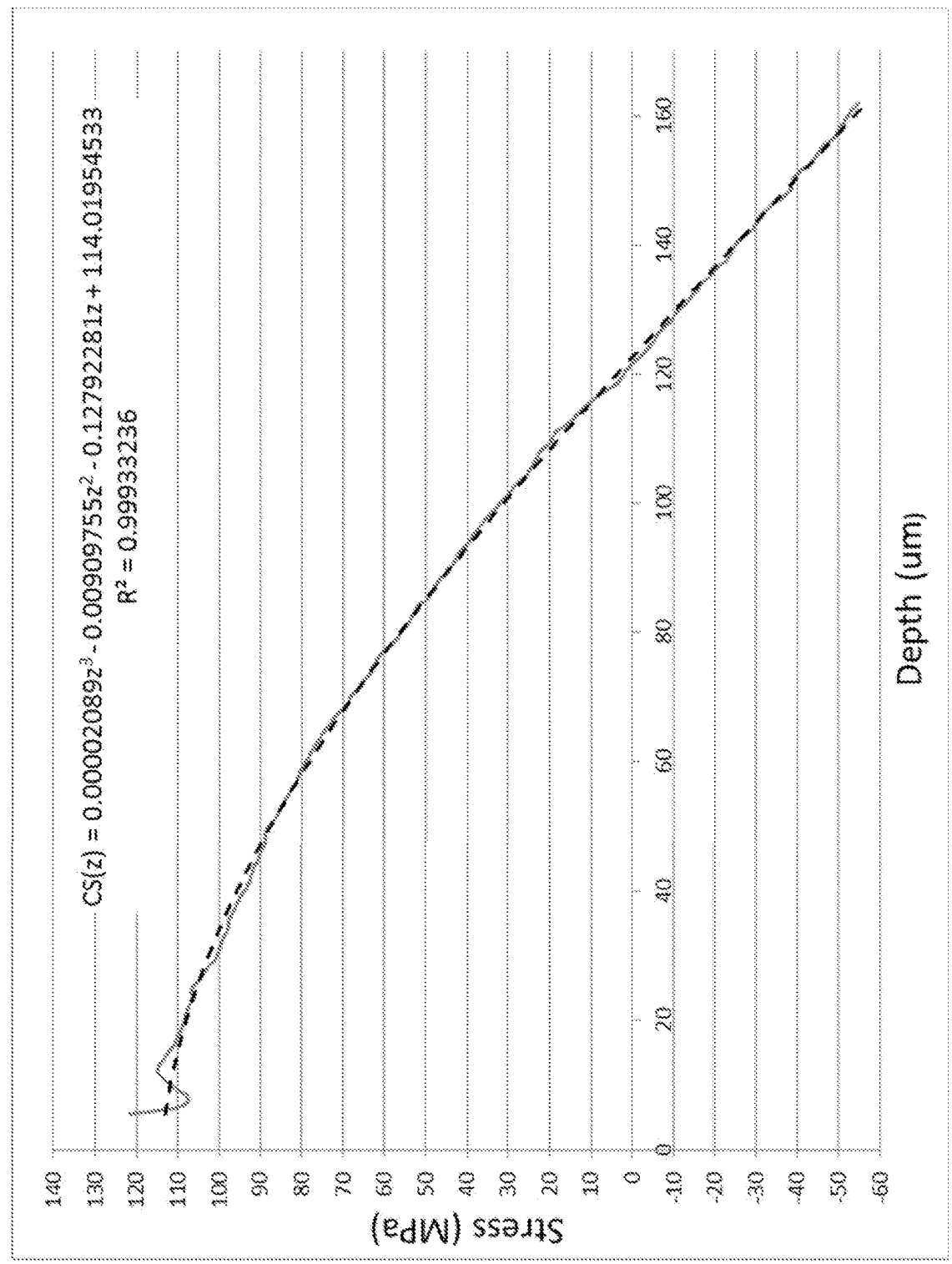
FIG. 20 is a plot of a portion of the stress profile of FIG. 19 including a polynomial fit.

FIG. 20 shows a deep portion of the measured stress profile of Example 5, and a third-order polynomial fit (dotted line). Prior to performing the polynomial fit the measure stress profile was smoothed using a LOESS smoothing algorithm. The polynomial fit was performed in the depth region of 5.5 μm to 161 μm (0.3t).

Figure 21:
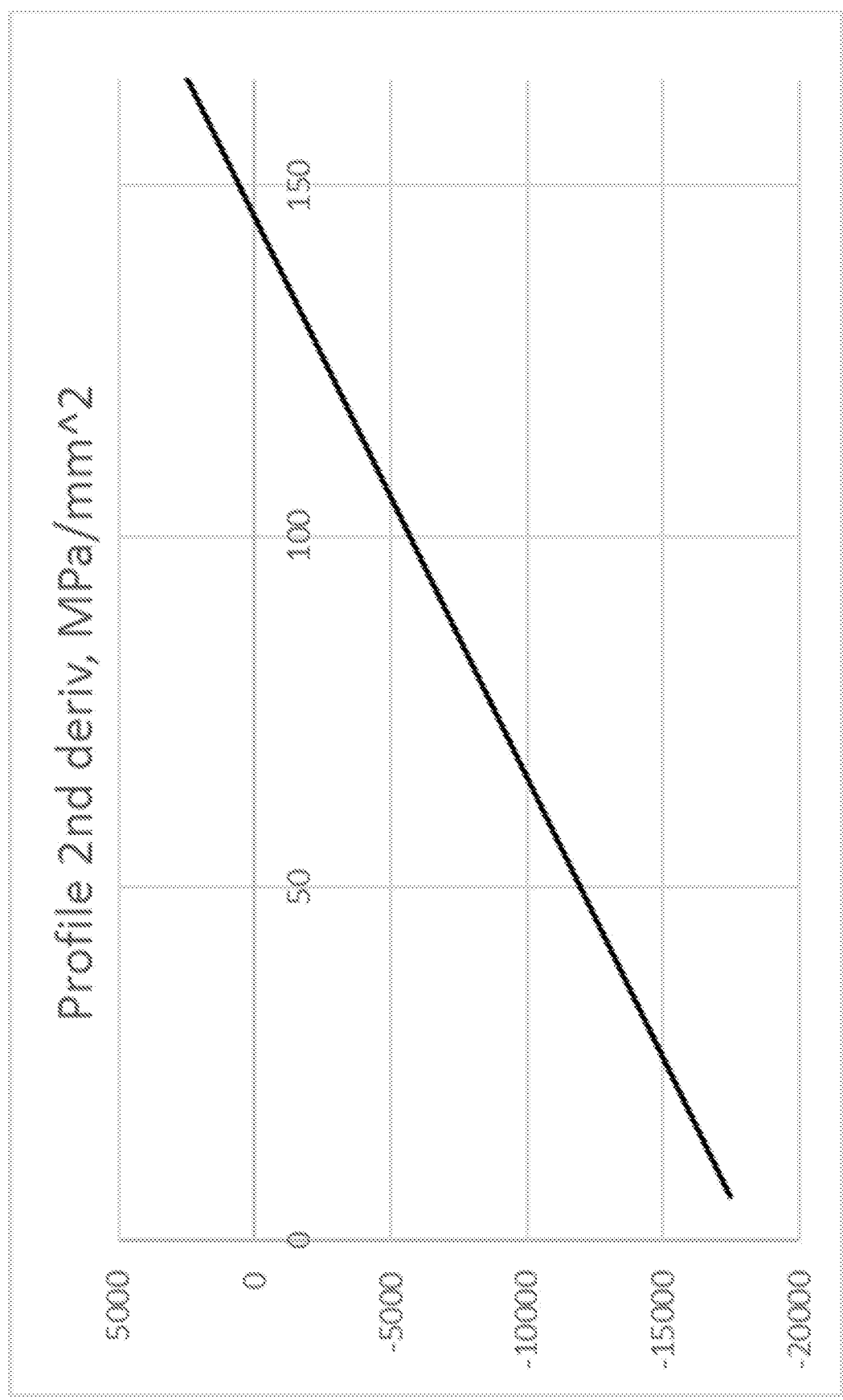
FIG. 21 is a plot of the second derivative of the polynomial fit of FIG. 20.

FIG. 21 is a plot of the second derivative of the polynomial fit of FIG. 20. As shown in FIG. 21, the second derivative has a value of zero, indicating a curvature transition point, at 145 μm (1.19·DOC; 0.27t). The minimum value of the second derivative in FIG. 18 is −16500 MPa/mm², and occurs at a depth of 13.5 μm. A maximum absolute value of the negative slope of a deep portion of the stress profile of FIG. 19 is 1.45 MPa/μm at a depth of 145 μm. The slope of the stress profile at the DOC is −1.42 MPa/μm.

Example 6

A glass-based substrate with a thickness of 0.658 mm was subjected to ion exchange in a bath containing 1.4 wt % $LiNO_3$, 10 wt % $NaNO_3$, and 88.6 wt % $KNO_3$ for a period of 7.33 hours to form the glass-based article of Example 6. The bath was maintained at temperature of 447° C., and silicic acid was added to the bath at a level of 0.5% of the total weight of the nitrates. The stress profile of Example 6 is substantially symmetric. Example 6 has a DOC of 140 μm, a $CS_{max}$ of 630 MPa, a $DOL_{sp}$ of 4.7 μm, a $CS_k$ in the range of 141 MPa, a PT of 123 MPa located at the center of the glass-based article. The compressive stress region depth integral was 12.3 MPa·mm (19.6t) in each compressive stress region. The stress profile was non-frangible. A third-order polynomial fit was performed in the depth region of 5.5 μm to 0.3t, and had an $R^2$ value of 0.9996. The second derivative has a value of zero, indicating a curvature transition point, at 135 μm (0.96t). The minimum value of the second derivative within the region from 0.025t to 0.25t is −13900 MPa/mm². A maximum absolute value of the negative slope of a deep portion of the stress profile is 1.306 MPa/μm at a depth of 135 μm. The slope of the stress profile at the DOC is −1.304 MPa/μm.

Comparative Examples

Comparative glass-based articles were prepared. The compositions of the glass-based substrates utilized to form the comparative glass-based substrates are given in Table 1. All of the glass-based substrates utilized to form the comparative examples had a thickness of 0.8 mm.

TABLE 1

| | Composition | |
|---|---|---|
| mol % | A | B |
| $SiO_2$ | 70.94 | 63.70 |
| $B_2O_3$ | 1.86 | 0.39 |
| $Al_2O_3$ | 12.83 | 16.18 |
| $Na_2O$ | 2.36 | 8.10 |
| $K_2O$ | | 0.53 |
| $Li_2O$ | 8.22 | 8.04 |
| MgO | 2.87 | 0.33 |
| ZnO | 0.83 | |
| $TiO_2$ | | 0.010 |
| $Fe_2O_3$ | 0.022 | 0.020 |
| $SnO_2$ | 0.06 | 0.05 |
| $P_2O_5$ | | 2.64 |

The ion exchange treatments for the comparative examples are provided in Table 2 below.

TABLE 2

| | 1st Bath | | | 2nd Bath | | |
|---|---|---|---|---|---|---|
| Comparative Example | $LiNO_3/NaNO_3/KNO_3$ (wt %) | Temperature (° C.) | Time (hr) | $LiNO_3/NaNO_3/KNO_3$ (wt %) | Temperature (° C.) | Time (hr) |
| 1 | 0/7/93 | 430 | 4.5 | N/A | N/A | N/A |
| 2 | 0.9/75/25 | 390 | 4 | 0.5/2/98 | 380 | 0.5 |
| 3 | 0.2/75/25 | 390 | 3.75 | 0.3/4/96 | 380 | 0.42 |

The measured characteristics of the comparative examples are provided in Table 3 below. Comparative Example 1 was the only comparative example to exhibit a region of negative curvature. The minimum value of the second derivative of Comparative Example 1 in the region of greater than or equal to 0.025t to less than or equal to 0.25t was greater than −3000 MPa/mm², and the curvature inflection point was located at about 0.58·DOC.

TABLE 3

| Comparative Example | $Cs_{max}$ (MPa) | $DOL_{sp}$ (μm) | $CS_k$ (MPa) | DOC (μm) | PT (MPa) | Slope at DOC (MPa/μm) |
|---|---|---|---|---|---|---|
| 1 | 688 | 8.10 | 117 | 178 | 86.4 | −0.7 |
| 2 | 848 | 8.30 | 95 | 170 | 78.6 | −0.65 |
| 3 | 839 | 8.70 | 130 | 163 | 83.4 | −0.75 |

All compositional components, relationships, and ratios described in this specification are provided in mol % unless otherwise stated. All ranges disclosed in this specification include any and all ranges and subranges encompassed by the broadly disclosed ranges whether or not explicitly stated before or after a range is disclosed.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A glass-based article, comprising:
a glass-based substrate comprising opposing first and second surfaces defining a substrate thickness (t); and
a stress profile comprising:
a peak tension (PT) of greater than or equal to 70 MPa; and
a point with a second derivative value of less than or equal to −4000 MPa/mm² where the point is located within the region of greater than or equal to 0.025t to less than or equal to 0.25t.

2. The glass-based article of claim 1, wherein the stress profile comprises a curvature transition point with a second derivative value of 0 MPa/mm², where the curvature transition point is located within the region of greater than or equal to 0.7·DOC to less than or equal to 0.25t.

3. The glass-based article of claim 1, wherein the stress profile comprises a point with a second derivative value of less than or equal to −2550/f2 MPa/mm² where t is in mm, and where the point is located within the region of greater than or equal to 0.025t to less than or equal to 0.25t.

4. The glass-based article of claim 1, comprising a compressive region extending from the first surface to a depth of compression (DOC), wherein the stress profile comprises a local maximum of an absolute value of the slope located within 0.1·DOC of the DOC.

5. The glass-based article of claim 1, wherein the PT is less than or equal to 200 MPa.

6. The glass-based article of claim 1, wherein the PT is greater than or equal to $$\frac{62.6}{\sqrt{t}} MPa$$

and less than or equal to $$\frac{170}{\sqrt{t}} MPa$$

where t is in mm.

7. The glass-based article of claim 1, wherein a glass-based substrate having the same composition and structure as the center of the glass-based article has a $K_{IC}$ of greater than or equal to 0.85 MPa·√m.

8. The glass-based article of claim 1, comprising a compressive stress at a knee ($CS_k$) greater than or equal to $$\frac{71.5}{\sqrt{t}} MPa$$

where t is in mm.

9. The glass-based article of claim 1, comprising a spike region extending from the first surface to a depth of layer of a spike ($DOL_{sp}$), and the $DOL_{sp}$ is greater than or equal to 3 μm.

10. The glass-based article of claim 1, wherein the stress profile comprises a first compressive region extending from the first surface to a first depth of compression $DOC_1$, a second compressive region extending from the second surface to a second depth of compression $DOC_2$, and a tensile region extending from $DOC_1$ to $DOC_2$,
wherein the tensile region has a tensile stress factor $K_T$ greater than or equal to 1.41 MPa·√m.

11. The glass-based article of claim 1, wherein a maximum $K_2O$ concentration in the glass-based article is less than or equal to 7.5 mol % greater than the $K_2O$ concentration at the center of the glass-based article.

12. The glass-based article of claim 1, comprising a spike region extending from the first surface to a depth of layer of a spike ($DOL_{sp}$), wherein an integral of a $K_2O$ concentration increase over a $K_2O$ concentration at the center of the glass-based article in the spike region is greater than or equal to 4 mol %·μm and less than or equal to 29 mol %·μm.

13. The glass-based article of claim 1, comprising a compressive region extending from the first surface to a depth of compression (DOC), and wherein:
a compressive stress at a depth of 0.6·DOC from the first surface is greater than or equal to 45 MPa;
a compressive stress at a depth of 0.65·DOC from the first surface is greater than or equal to 40 MPa;
a compressive stress at a depth of 0.7·DOC from the first surface is greater than or equal to 37 MPa;
a compressive stress at a depth of 0.75·DOC from the first surface is greater than or equal to 32 MPa;
a compressive stress at a depth of 0.8·DOC from the first surface is greater than or equal to 26 MPa;
a compressive stress at a depth of 0.85·DOC from the first surface is greater than or equal to 18 MPa; and
a compressive stress at a depth of 0.9·DOC from the first surface is greater than or equal to 11 MPa.

14. The glass-based article of claim 1, comprising a $Na_2O$ concentration profile in the region of greater than or equal to 0.025t to less than or equal to 0.25t, and wherein the $Na_2O$ concentration profile exhibits a positive curvature or no curvature in the region of greater than or equal to 0.025t to less than or equal to 0.25t.

15. The glass-based article of claim 1, wherein the center of the glass-based article comprises:
50 mol % to 69 mol % $SiO_2$;
12.5 mol % to 25 mol % $Al_2O_3$;
0 mol % to 8 mol % $B_2O_3$;
greater than 0 mol % to 4 mol % CaO;
greater than 0 mol % to 17.5 mol % MgO;
0.5 mol % to 8 mol % $Na_2O$;
0 mol % to 2.5 mol % $La_2O_3$; and
greater than 8 mol % to 18 mol % $Li_2O$;
wherein:
($Li_2O+Na_2O+MgO$)/$Al_2O_3$ is from 0.9 to less than 1.3; and
$Al_2O_3+MgO+Li_2O+ZrO_2+La_2O_3+Y_2O_3$ is from greater than 23 mol % to less than 50 mol %.

16. The glass-based article of claim 1, wherein the second derivative at the point is from less than or equal to −5000 MPa/mm² to greater than or equal to −50000 MPa/mm².

17. A consumer electronic product comprising:
a housing comprising a front surface, a back surface, and side surfaces;
electrical components provided at least partially within the housing, the electrical components comprising at least a controller, a memory, and a display, the display being provided at or adjacent the front surface of the housing; and a cover disposed over the display;

wherein at least a portion of at least one of the housing and the cover comprises the glass-based article of claim 1.

18. A method, comprising:

exposing to an ion exchange treatment a glass-based substrate comprising opposing first and second surfaces defining a substrate thickness (t) to form a glass-based article with a stress profile comprising, the stress profile comprising:

a peak tension (PT) of greater than or equal to 70 MPa; and a point with a second derivative value of less than or equal to −4000 MPa/mm$^2$ where the point is located within the region of greater than or equal to 0.025t to less than or equal to 0.25t.

19. The method of claim 18, wherein the ion exchange treatment is a single ion exchange treatment.

20. The method of claim 18, wherein the glass-based substrate comprises:

50 mol % to 69 mol % $SiO_2$;
12.5 mol % to 25 mol % $Al_2O_3$;
0 mol % to 8 mol % $B_2O_3$;
greater than 0 mol % to 4 mol % CaO;
greater than 0 mol % to 17.5 mol % MgO;
0.5 mol % to 8 mol % $Na_2O$;
0 mol % to 2.5 mol % $La_2O_3$; and
greater than 8 mol % to 18 mol % $Li_2O$;

wherein:

$(Li_2O+Na_2O+MgO)/Al_2O_3$ is from 0.9 to less than 1.3; and $Al_2O_3+MgO+Li_2O+ZrO_2+La_2O_3+Y_2O_3$ is from greater than 23 mol % to less than 50 mol %.

* * * * *